(12) United States Patent
Ueda et al.

(10) Patent No.: US 8,237,392 B2
(45) Date of Patent: Aug. 7, 2012

(54) MOTOR CONTROL APPARATUS AND ELECTRIC POWER STEERING APPARATUS

(75) Inventors: Takeshi Ueda, Kashiba (JP); Shigeki Nagase, Nabari (JP)

(73) Assignee: JTEKT Corporation, Osaka (JP)

( * ) Notice: Subject to any disclaimer, the term of this patent is extended or adjusted under 35 U.S.C. 154(b) by 481 days.

(21) Appl. No.: 12/461,764

(22) Filed: Aug. 24, 2009

(65) Prior Publication Data

US 2010/0045217 A1    Feb. 25, 2010

(30) Foreign Application Priority Data

Aug. 25, 2008  (JP) ................................ 2008-214978
Dec. 22, 2008  (JP) ................................ 2008-325594

(51) Int. Cl.
  *G05B 11/28*    (2006.01)
(52) U.S. Cl. ........................................ 318/599; 318/811
(58) Field of Classification Search .................. 318/599, 318/811, 727, 798, 801, 812
See application file for complete search history.

(56) References Cited

U.S. PATENT DOCUMENTS

| | | | | |
|---|---|---|---|---|
| 5,121,043 A | * | 6/1992 | Kerkman et al. | 318/805 |
| 5,903,128 A | * | 5/1999 | Sakakibara et al. | 318/721 |
| 6,166,514 A | * | 12/2000 | Ando et al. | 318/811 |
| 6,315,081 B1 | * | 11/2001 | Yeo | 187/290 |
| 6,329,781 B1 | * | 12/2001 | Matsui et al. | 318/717 |
| 7,009,349 B2 | * | 3/2006 | Nagase et al. | 318/133 |
| 2006/0066270 A1 | | 3/2006 | Kumagai et al. | |
| 2006/0119312 A1 | * | 6/2006 | Okamura et al. | 318/807 |
| 2006/0197480 A1 | * | 9/2006 | Mori et al. | 318/254 |
| 2008/0042605 A1 | * | 2/2008 | Subrata et al. | 318/449 |
| 2008/0056690 A1 | * | 3/2008 | Fujishiro et al. | 388/820 |

FOREIGN PATENT DOCUMENTS

| | | |
|---|---|---|
| EP | 1 705 789 A2 | 9/2006 |
| EP | 1 959 556 A2 | 8/2008 |
| JP | A-2001-278086 | 10/2001 |
| JP | A-2005-170225 | 6/2005 |
| JP | A-2007-228767 | 9/2007 |

OTHER PUBLICATIONS

European Search Report for corresponding European Patent Application No. 09168476.1, mailed on Nov. 22, 2010.

* cited by examiner

*Primary Examiner* — Rina Duda
(74) *Attorney, Agent, or Firm* — Oliff & Berridge, PLC

(57) ABSTRACT

An angle calculation portion of a motor control apparatus determines an angle θ of a rotor, and an angular velocity calculation portion determines an angular velocity ωe of the rotor. A command current calculation portion determines command currents id* and iq* on dq axes, based on a steering torque T and a vehicle speed S. An open-loop control portion determines command voltages vd and vq on the dq axes based on the command currents id* and iq* and the angular velocity ωe, according to circuit equations of a motor. A dq-axis/three-phase conversion portion converts the command voltages vd and vq to command voltages of three phases. A three-phase voltage correction portion corrects the command voltage so that an actual time average value of a voltage applied to each phase is equal to a time average value of a voltage that is to be applied to the phase if the voltage is not decreased, in order to compensate for a decrease in the applied voltage. By performing the correction, it is possible to eliminate or suppress a decrease in control accuracy due to a wiring resistance and the like.

11 Claims, 14 Drawing Sheets

MOTOR CONTROL APPARATUS AND ELECTRIC POWER STEERING APPARATUS

INCORPORATION BY REFERENCE

The disclosure of Japanese Patent Applications No. 2008-214978 and No. 2008-325594 respectively filed on Aug. 25, 2008 and Dec. 22, 2008, each including the specification, drawings and abstract, are incorporated herein by reference in their entireties.

BACKGROUND OF THE INVENTION

1. Field of the Invention

The invention relates to a motor control apparatus, and an electric power steering apparatus including the motor control apparatus.

2. Description of the Related Art

An electric power steering apparatus that provides a steering assist force to a steering mechanism of a vehicle by driving an electric motor in accordance with a steering torque applied to a steering wheel by a driver has been used. A brush motor has been widely used as the electric motor of the electric power steering apparatus. Recently, a brushless motor has also been used as the electric motor of the electric power steering apparatus, from the viewpoints of improvement of reliability and durability, a decrease in inertia, and the like.

To control a torque generated by the motor, a motor control apparatus detects a current flowing into the motor, and executes a feedback control based on the difference between a current to be supplied to the motor and the detected current. Generally, the control is executed by appropriately setting voltages applied to phases of the motor by turning on/off a plurality of switching elements included in a switching circuit that drives the motor (typically by using the duty ratios of PWM signals). In the motor control apparatus, a voltage applied to the switching circuit that drives the motor, typically a power supply voltage is measured, and the above-described control is executed based on the measured voltage.

Japanese Patent Application Publication No. 2001-278086 (JP-A-2001-278086) describes the configuration in which a power supply voltage and voltages at both terminals of a motor are measured, and the terminal voltages of the motor are corrected based on the measured values when steering is assisted. Also, Japanese Patent Application Publication No. 2005-170225 (JP-A-2005-170225) describes the configuration in which the average voltage of a battery and a peak current flowing into the motor are measured, and a corrected current value is calculated based on the measured values.

In each of the technologies described in Japanese Patent Application Publication No. 2001-278086 and Japanese Patent Application Publication No. 2005-170225, correction for each phase of the motor is not performed. Therefore, control accuracy may not be sufficiently high. For example, in the switching circuit that drives the motor, the voltage may drop due to a shunt resistance and a wiring. Therefore, the voltage applied to the motor may be different from the power supply voltage. Accordingly, particularly when a large current flows into the motor, the difference between the current to be supplied to each phase of the motor and the current that actually flows into the phase of the motor increases due to the resistance. Therefore, the control accuracy decreases.

SUMMARY OF THE INVENTION

An object of the invention is to provide a motor control apparatus that solves the above-described problem, and an electric power steering apparatus including the motor control apparatus.

An aspect of the invention relates to a motor control apparatus that drives a motor with n phases (n is a natural number). The motor control apparatus includes a controller that determines a level of a command voltage used to drive the motor; a motor drive signal generator that generates a pulse width modulation (PWM) signal having a predetermined pulse width in each unit period, using a voltage whose level is equal to the level determined by the controller; and a motor drive circuit. The motor drive circuit has a plurality of switching elements that drive the motor based on the pulse width modulation signal from the motor drive signal generator, and a switching circuit that supplies a current into the motor when the pulse width modulation signal turns the plurality of switching elements on/off. The controller performs correction to correct the level of the command voltage to compensate for a change in a voltage applied to the motor drive circuit, according to on/off states of the switching elements. According to the aspect, the controller corrects the level of the command voltage to compensate for a change in the voltage applied to each phase due to a wiring resistance and the like. Therefore, it is possible to eliminate or suppress a decrease in control accuracy due to the wiring resistance and the like, and to drive the motor with high accuracy.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
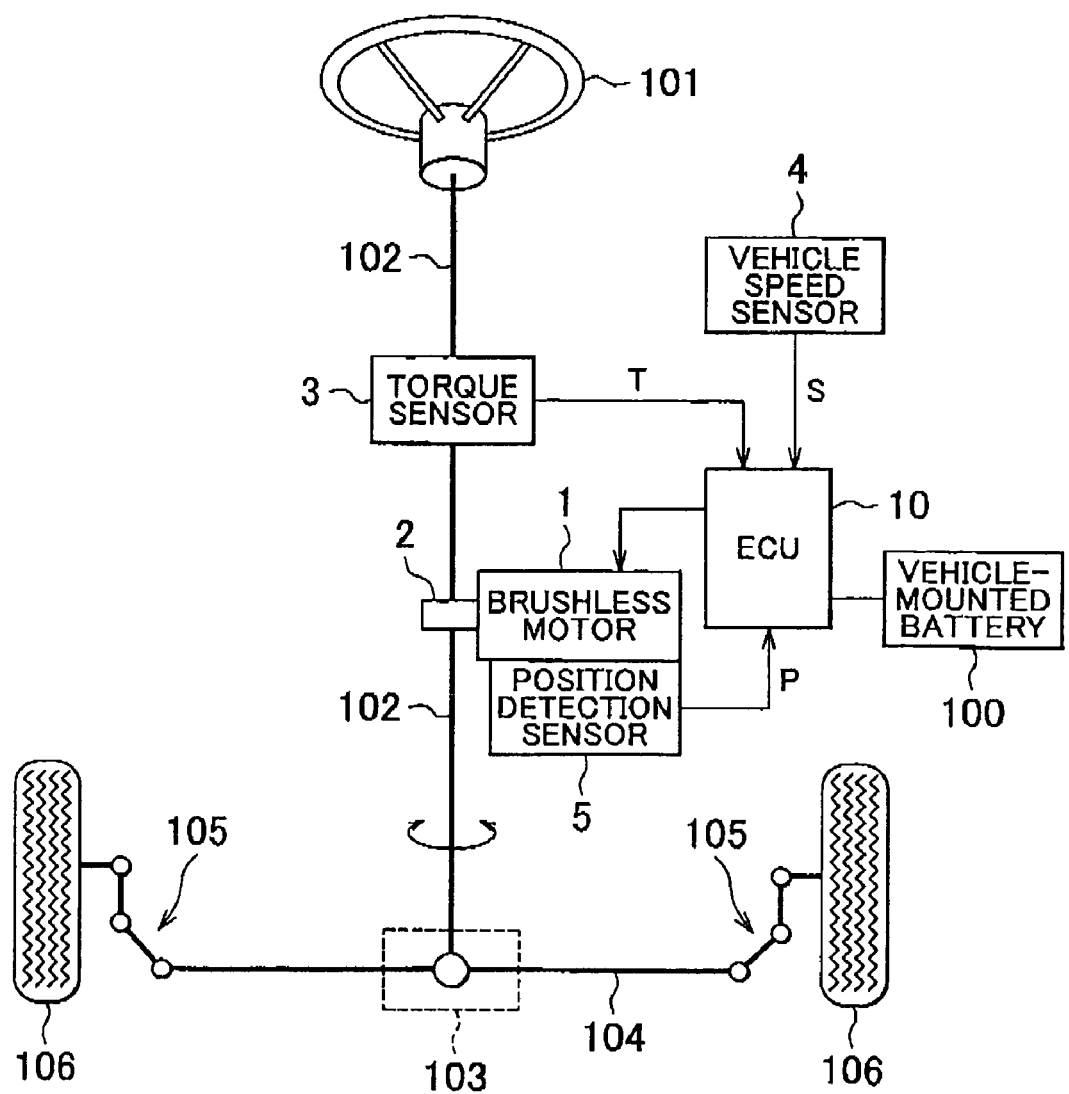
FIG. 1 is a schematic diagram showing the configuration of an electric power steering apparatus according to a first embodiment.

Hereinafter, each embodiment of the invention will be described with reference to the accompanying drawings. FIG. 1 is a schematic diagram showing the configuration of an electric power steering apparatus according to a first embodiment of the invention, and the configuration of a vehicle relating to the electric power steering apparatus. The electric power steering apparatus shown in FIG. 1 is a column assist electric power steering apparatus that includes a brushless motor 1, a speed reducer 2, a torque sensor 3, a vehicle speed sensor 4, a position detection sensor 5, and an Electronic Control Unit (hereinafter, referred to as "ECU") 10.

As shown in FIG. 1, a steering wheel 101 is fixed to one end of a steering shaft 102. A rack shaft 104 is coupled to the other end of the steering shaft 102 through a rack pinion mechanism 103. Both ends of the rack shaft 104 are coupled to respective wheels 106 through a coupling member 105 that includes a tie rod and a knuckle arm. When a driver rotates the steering wheel 101, the steering shaft 102 rotates, and the rack shaft 104 reciprocates in accordance with the rotation of the steering shaft 102. The directions of the wheels 106 are changed in accordance with the reciprocation of the rack shaft 104.

The electric power steering apparatus performs the following steering assistance to reduce the load for the driver. The torque sensor 3 detects a steering torque T that is applied to the steering shaft 102 when the driver operates the steering wheel 101. The vehicle speed sensor 4 detects a vehicle speed S. The position detection sensor 5 detects a rotation position P of a rotor of the brushless motor 1. The position detection sensor 5 is, for example, a resolver.

The ECU 10 receives electric power supplied from a vehicle-mounted battery 100, and drives the brushless motor 1 based on the steering torque T, the vehicle speed S, and the rotation position P. When the brushless motor 1 is driven by the ECU 10, the brushless motor 1 generates a steering assist force. The speed reducer 2 is provided between the brushless motor 1 and the steering shaft 102. The steering assist force generated by the brushless motor 1 acts to rotate the steering shaft 102 through the speed reducer 2.

As a result, the steering shaft 102 is rotated by both of the steering torque applied to the steering wheel 101, and the steering assist force generated by the brushless motor 1. Thus, the electric power steering apparatus performs the steering assistance, by providing the steering assist force generated by the brushless motor 1 to the steering mechanism of the vehicle.

A feature of the electric power steering apparatus according to the first embodiment of the invention is a control apparatus (a motor control apparatus) that drives the brushless motor 1. Hereinafter, the motor control apparatus included in the electric power steering apparatus will be described.

Figure 2:
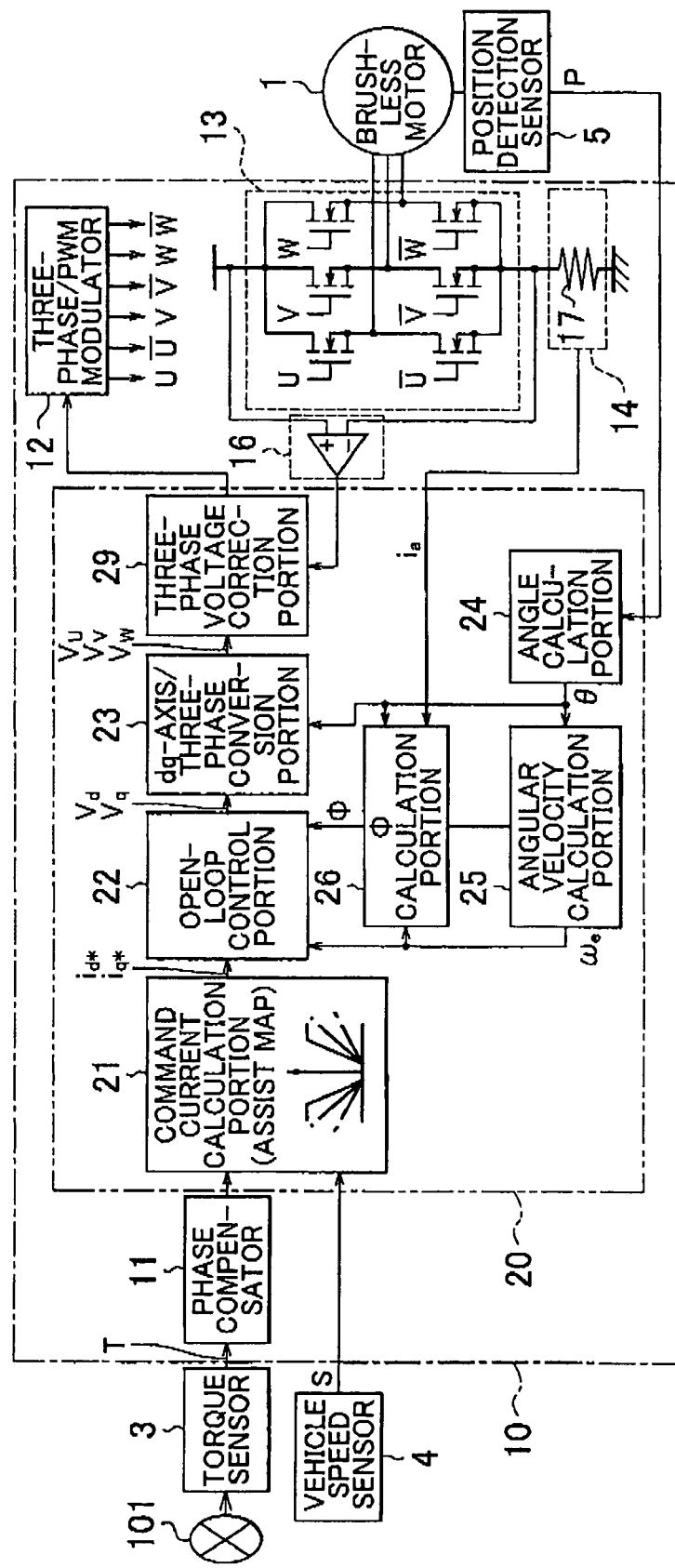
FIG. 2 is a block diagram showing the configuration of a motor control apparatus according to the first embodiment.

FIG. 2 is a block diagram showing the configuration of the motor control apparatus according to the first embodiment of the invention. The motor control apparatus shown in FIG. 2 includes the ECU 10. The motor control apparatus drives the brushless motor 1 that includes a three-phase winding (not shown) consisting of a u-phase winding, a v-phase winding, and a w-phase winding. The ECU 10 includes a phase compensator 11, a microcomputer 20, a three-phase/Pulse Width Modulation (PWM) modulator 12, a motor drive circuit 13, a current sensor 14, and a voltage sensor 16.

The ECU 10 receives a signal indicating the steering torque T output from the torque sensor 3, a signal indicating the vehicle speed S output from the vehicle speed sensor 4, and a signal indicating the rotation position P output from the position detection sensor 5. The phase compensator 11 performs phase compensation for the steering torque T. The microcomputer 20 functions as a controller that determines the levels of command voltages used to drive the brushless motor 1. The functions of the microcomputer 20 will be described in detail later.

The three-phase/PWM modulator 12 and the motor drive circuit 13 are constituted by hardware, and function as a motor driver that drives the brushless motor 1 using voltages whose levels are equal to the levels determined by the microcomputer 20. The three-phase/PWM modulator 12 generates three types of PWM signals (a u-phase PWM signal, a v-phase PWM signal, and a w-phase PWM signal shown in FIG. 2). The PWM signals have duty ratios corresponding to the voltage levels of three phases determined by the microcomputer 20. The motor drive circuit 13 is a PWM voltage inverter circuit that includes six Metal Oxide Semiconductor Field Effect Transistors (MOS-FETs) that function as switching elements. The six MOS-FETs are controlled by the three types of PWM signals and negation signals thereof. Drive currents of three phases (a u-phase current, a v-phase current, and a w-phase current) are supplied to the brushless motor 1, by controlling the conduction states of the MOS-FETs using the PWM signals. Thus, the motor drive circuit 13 includes the plurality of switching elements, and functions as a switching circuit that supplies the currents to the brushless motor 1.

The current sensor 14 functions as a current detector that detects the currents flowing into the brushless motor 1. The current sensor 14 includes, for example, a resistor and a Hall element. Only one current sensor 14 is provided between the motor drive circuit 13 and a power supply. In the example shown in FIG. 2, the current sensor 14 is provided between the motor drive circuit 13 and a negative electrode side of the power supply (i.e., a ground point). However, the current sensor 14 may be provided between the motor drive circuit 13 and a positive electrode side of the power supply.

While the brushless motor 1 rotates, a current value detected by the current sensor 14 changes according to the PWM signals. During one period of the PWM signals (hereinafter, referred to as "PWM period"), the current sensor 14 may detect the drive current of one phase, and may detect the sum of the drive currents of two phases. The sum of the drive currents of three phases is substantially zero. Therefore, based on the sum of the drive currents of two phases, the drive current of one phase other than the two phases is determined. Accordingly, it is possible to detect the drive currents of three phases using one current sensor 14, while the brushless motor 1 rotates. The current value ia detected by the current sensor 14 is input to the microcomputer 20.

The voltage sensor 16 includes a differential amplifier. One input terminal of the voltage sensor 16 is connected between the motor drive circuit 13 and the positive electrode side of the power supply. The other input terminal of the voltage sensor 16 is connected between the motor drive circuit 13 and a shunt resistance 17. An output terminal of the voltage sensor 16 is connected to a three-phase voltage correction portion 29. Thus, it is possible to accurately detect a voltage Vb applied to both ends of the motor drive circuit 13, by providing the voltage sensor 16 in the above-described manner. If one end of the shunt resistance 17 is connected to the positive electrode side of the power supply in FIG. 2, one input terminal of the voltage sensor 16 is connected between the motor drive circuit 13 and the shunt resistance 17.

The microcomputer 20 functions as a command current calculation portion 21, an open-loop control portion 22, a dq-axis/three-phase conversion portion 23, an angle calculation portion 24, an angular velocity calculation portion 25, a Φ calculation portion 26, and a three-phase voltage correction portion 29, by executing a program stored in a memory (not shown) provided in the ECU 10. The microcomputer 20 determines the levels of the voltages to be applied to the motor drive circuit 13 (hereinafter, the voltages will be referred to as "command voltages"), based on command current values indicating amounts of currents to be supplied to the brushless motor 1, and the angular velocity of the rotor of the brushless motor 1, according to circuit equations of the motor, as described below.

Figure 3:
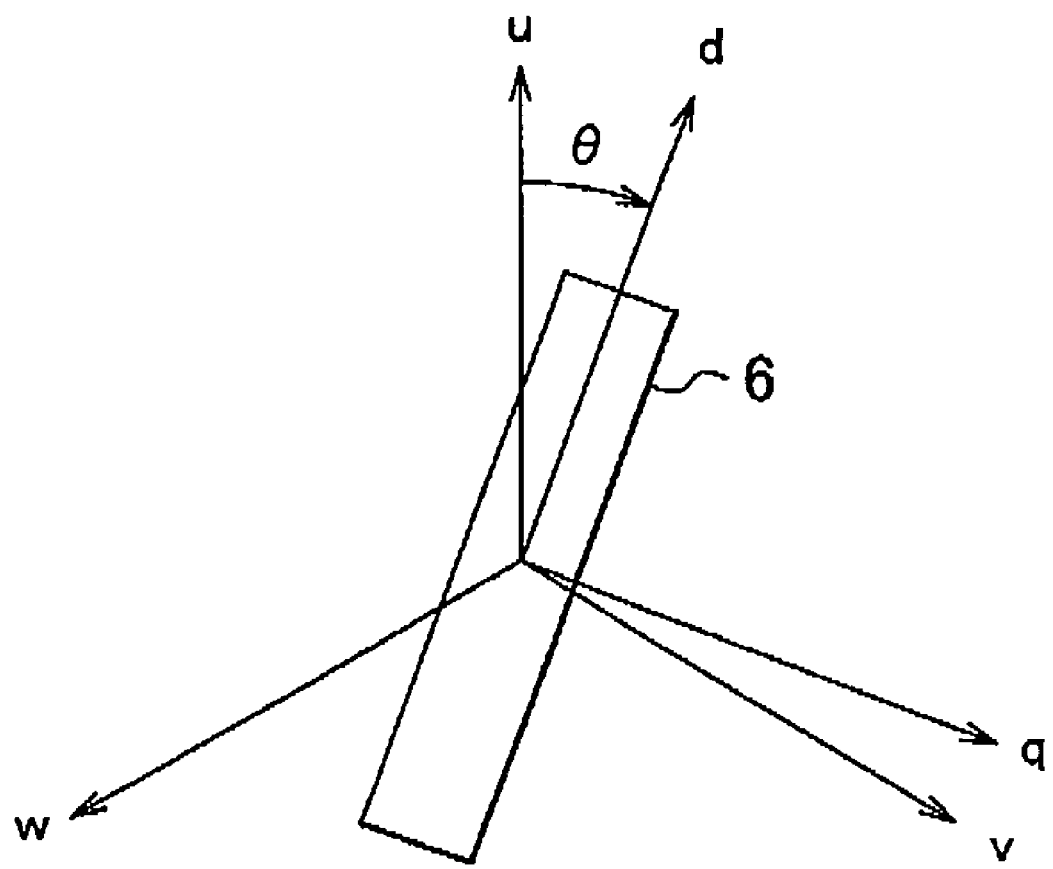
FIG. 3 is a diagram showing three-phase AC coordinate axes and dq coordinate axes of a three-phase brushless motor in the first embodiment.

The angle calculation portion 24 determines a rotation angle of the rotor of the brushless motor 1 (hereinafter, the rotation angle will be referred to as "angle θ"), based on the rotation position P detected by the position detection sensor 5. The angular velocity calculation portion 25 determines an angular velocity ωe of the rotor of the brushless motor 1 based on the angle θ. When a u-axis, a v-axis, and a w-axis are set with respect to the brushless motor 1, and a d-axis and a q-axis are set with respect to the rotor 6 of the brushless motor 1 as shown in FIG. 3, the angle between the u-axis and the d-axis is the angle θ.

The command current calculation portion 21 determines a d-axis current and a q-axis current to be supplied to the brushless motor 1 (hereinafter, the d-axis current will be referred to as "d-axis command current id*", and the q-axis current will be referred to as "q-axis command current iq*"), based on the steering torque T after the phase compensation is performed (i.e., a signal output from the phase compensator 11), and the vehicle speed S. More specifically, a table (hereinafter, referred to as "assist map") is provided in the command current calculation portion 21. In the assist map, the corresponding relation between the steering torque T and the command currents is stored using the vehicle speed S as a parameter. The command current calculation portion 21 determines the command currents by referring to the assist map. Thus, when a certain steering torque is applied, it is possible to determine the d-axis command current id* and the q-axis command current iq* to be supplied to the brushless motor 1 to generate an appropriate steering assist force in accordance with the certain steering torque, by using the assist map.

The q-axis command current iq* determined by the command current calculation portion 21 is a signed current value. The sign of the current value indicates a steering assisting direction. For example, when the sign is a positive sign, the steering assistance is performed to turn the vehicle to the right. When the sign is a negative sign, the steering assistance is performed to turn the vehicle to the left. The d-axis command current id* is typically set to zero.

The open-loop control portion 22 determines a d-axis voltage and a q-axis voltage to be supplied to the brushless motor 1 (hereinafter, the d-axis voltage will be referred to as "d-axis command voltage vd", and the q-axis voltage will be referred to as "q-axis command voltage vq"), based on the d-axis command current id*, the q-axis command current iq*, and the angular velocity ωe. The d-axis command voltage vd and the q-axis command voltage vq are calculated using the following circuit equations (1) and (2) of the motor.

$$vd = (R+PLd)id^* - \omega eLqiq^* \quad (1)$$

$$vq = (R+PLq)iq^* + \omega eLdid^* + \omega e\Phi \quad (2)$$

In the equations (1) and (2), vd represents the d-axis command voltage, vq represents the q-axis command voltage, id* represents the d-axis command current, iq* represents the q-axis command current, ωe represents the angular velocity of the rotor, R represents a circuit resistance including an armature winding resistance, Ld represents a self-inductance of the q-axis, Φ represents an armature winding flux linkage value, and P represents a differential operator. The armature winding flux linkage value Φ is equivalent to a value obtained by multiplying the maximum number of u-phase, v-phase, and w-phase armature winding flux linkages by $\sqrt{(3/2)}$. Among them, R, Ld, Lq, and (are handled as known parameters. The above-described circuit resistance includes, for example, a wiring resistance between the brushless motor 1 and the ECU 10, and the resistance of the motor drive circuit 13 and a wiring resistance in the ECU 10.

The dq-axis/three-phase conversion portion 23 converts the d-axis command voltage vd and the q-axis command voltage vq determined by the open-loop control portion 22, to command voltages on three-phase AC coordinate axes. More specifically, the dq-axis/three-phase conversion portion 23 determines a u-phase command voltage Vu, a v-phase command voltage Vv, and a w-phase command voltage Vw based on the d-axis command voltage vd and the q-axis command voltage vq, using the following equations (3) to (5).

$$Vu = \sqrt{(2/3)} \times \{vd \times \cos\theta - vq \times \sin\theta\} \quad (3)$$

$$Vv = \sqrt{(2/3)} \times \{vd \times \cos(\theta - 2\pi/3) - vq \times \sin(\theta - 2\pi/3)\} \quad (4)$$

$$Vw = -Vu - Vv \quad (5)$$

The angle θ included in each of the equations (3) and (4) is determined by the angle calculation portion 24.

The three-phase voltage correction portion 29 corrects the u-phase command voltage Vu, the v-phase command voltage Vv, and the w-phase command voltage Vw determined by the dq-axis/three-phase conversion portion 23, to compensate for a voltage drop caused by the resistance of the motor drive circuit 13 and the wiring resistance in the ECU 10, based on a voltage at both ends of the motor drive circuit 13. The voltage at the both ends of the motor drive circuit 13 is detected by the voltage sensor 16. Then, the three-phase voltage correction portion 29 generates and outputs the corrected u-phase command voltage Vu, the corrected v-phase command voltage Vv, and the corrected w-phase command voltage Vw. The correction will be described in detail later.

The microcomputer 20 performs the process of determining the command currents id* and iq* on the dq coordinate axes, the process of determining the command voltages vd and vq on the dq coordinate axes according to the circuit equations of the motor, and the process of converting the command voltages vd and vq to the command voltages Vu, Vv, and Vw of three phases. The three-phase/PWM modulator 12 outputs the three types of PWM signals based on the command voltages Vu, Vv, and Vw of three phases determined by the microcomputer 20. Thus, a sinusoidal current corresponding to the command voltage of each phase flows into the three-phase winding of the brushless motor 1, and the rotor of the brushless motor 1 rotates. Accordingly, a torque corresponding to the current flowing into the brushless motor 1 is generated in a rotation shaft of the brushless motor 1. The generated torque is used for steering assistance.

The Φ calculation portion 26 receives the current value ia detected by the current sensor 14, the angle θ calculated by the angle calculation portion 24, and the angular velocity ωe calculated by the angular velocity calculation portion 25. First, the Φ calculation portion 26 determines a u-phase current and a v-phase current that flow into the brushless motor 1 (hereinafter, the u-phase current will be referred to as "detected u-phase current iu", and the v-phase current will be referred to as "detected v-phase current iv"), based on the current value ia. Then, the Φ calculation portion 26 converts the detected u-phase current iu and the detected v-phase current iv to current values on the dq coordinate axes. More specifically, the Φ calculation portion 26 determines a detected d-axis current id and a detected q-axis current iq based on the detected u-phase current id and the detected v-phase current iv, using the following equations (6) and (7).

$$id=\sqrt{2}\times\{iv\times\sin\theta-iu\times\sin(\theta-2\pi/3)\} \quad (6)$$

$$iq=\sqrt{2}\times\{iv\times\cos\theta-iu\times\cos(\theta-2\pi/3)\} \quad (7)$$

The angle θ included in each of the equations (6) and (7) is determined by the angle calculation portion 24.

When the angular velocity ωe is not 0, the Φ calculation portion 26 determines the armature winding flux linkage value Φ contained in the equation (2), based on the q-axis command voltage vq, the detected d-axis current id, the detected q-axis current iq, and the angular velocity ωe, using the following equation (8).

$$\Phi=\{vq-(R+PLq)iq-\omega eLdid\}/\omega e \quad (8)$$

The equation (8) for obtaining Φ is derived by substituting the detected d-axis current id and the detected q-axis current iq for the d-axis command current id* and the q-axis command current iq* in the equation (2), and transforming the equation (2).

The Φ calculation portion 26 outputs the determined value of Φ to the open-loop control portion 22. The open-loop control portion 22 uses the value of Φ calculated by the Φ calculation portion 26 when the q-axis command voltage vq is determined using the equation (2). Thus, the microcomputer 20 determines the armature winding flux linkage value Φ contained in the circuit equation of the motor, and uses the value of Φ when the q-axis command voltage vq is determined.

As described above, the motor control apparatus according to the embodiment determines the value of Φ contained in the circuit equation of the motor, based on the current value detected by the current sensor, and uses the determined value of Φ. The control apparatus according to the embodiment determines the command voltages used for the open-loop control, based on the command current values and the angular velocity of the rotor, according to the circuit equations of the motor. Next, the operation of correcting the u-phase command voltage Vu, the v-phase command voltage Vv, and the w-phase command voltage Vw will be described in detail. The correction operation is performed by the three-phase voltage correction portion 29.

In the above-described embodiment, the current sensor 14 is provided between the motor drive circuit 13 and the negative electrode side of the power supply (i.e., the ground point) as shown in FIG. 2. Therefore, the voltage may drop due to, for example, the shunt resistance in the current sensor 14 and the wiring resistance, and accordingly, the voltage applied to the motor may be different from the power supply voltage. Accordingly, it is necessary to accurately acquire the voltage that is actually applied to the motor. Thus, by providing the detector that detects a portion of the power supply voltage that is actually applied to the motor (i.e., the voltage sensor 16 in the embodiment), it is possible to accurately acquire the voltage applied to the motor, and to accurately and stably execute a control.

The detected voltage is not always constant. At least one of the drive currents of three phases (the u-phase current, the v-phase current, and the w-phase current) may flow thorough the above-described resistances, or no drive current may flow through the above-described resistances, depending on the conduction states of the MOS-FETs included in the motor drive circuit 13. The drive current that flows through the above-described resistances changes depending on the conduction states of the MOS-FETs. Accordingly, the detected voltage changes. For example, when the three upper MOS-FETs among the six MOS-FETs are turned on, the three lower MOS-FETS are turned off, and therefore, the drive currents circulate in the motor drive circuit 13, and no current flows through the wiring resistance and the like. As a result, the voltage applied to the motor does not drop. However, when one or two of the three upper MOS-FETs is (are) turned on, the drive current(s) flow(s) through the wiring resistance and the like. As a result, the voltage applied to the motor drops.

Figure 4:
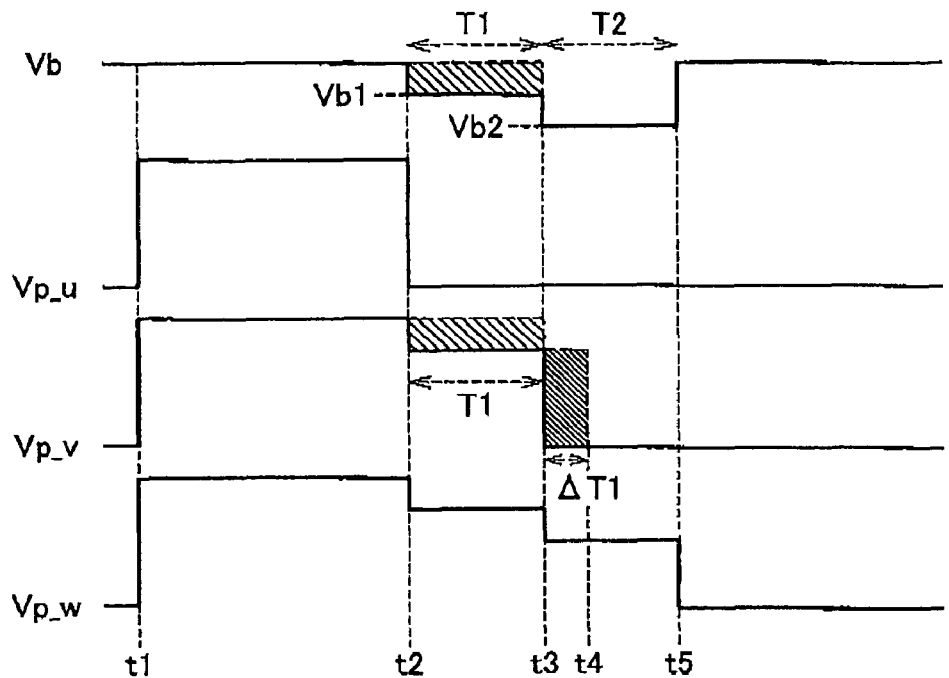
FIG. 4 is a diagram showing changes in a voltage applied to both ends of a motor drive circuit, changes in voltages applied to phases of the motor, and a manner in which the v-phase voltage is corrected with respect to the changes in the first embodiment.
Figure 5:
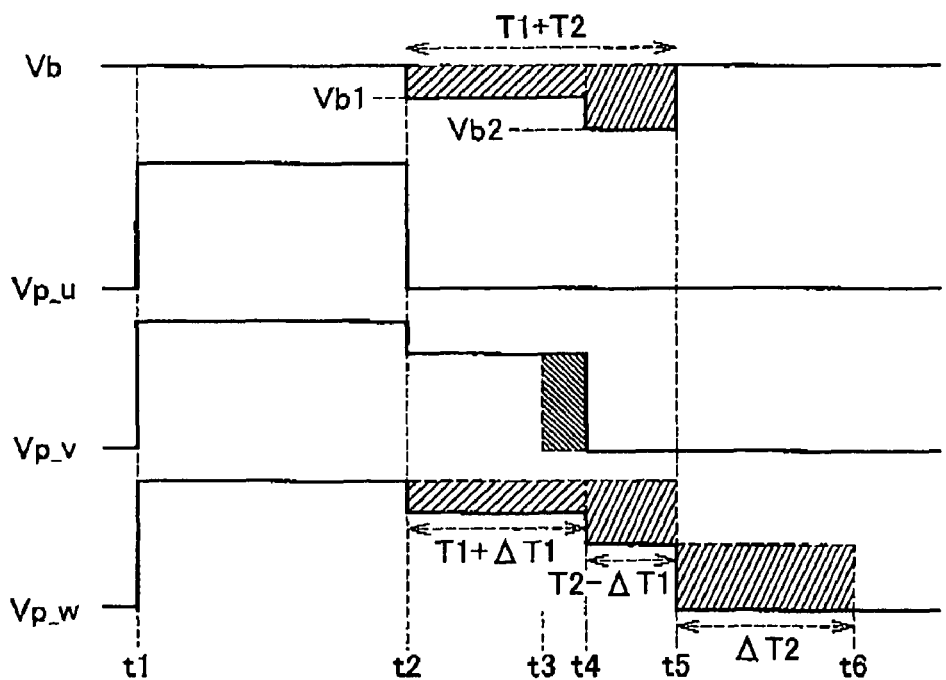
FIG. 5 is a diagram showing changes in the voltage applied to the both ends of the motor drive circuit, changes in the voltages applied to the phases of the motor, and a manner in which the w-phase voltage is corrected with respect to the changes after the correction shown in FIG. 4 is performed, in the first embodiment.

FIG. 4 is a diagram showing changes in the voltage applied to the both ends of the motor drive circuit, changes in the voltages applied to the phases of the motor, and a manner in which the v-phase voltage is corrected with respect to the changes, during one PWM period. FIG. 5 is a diagram showing changes in the voltage applied to the both ends of the motor drive circuit, changes in the voltages applied to the phases of the motor, and a manner in which the w-phase voltage is corrected with respect to the changes, after the correction described in FIG. 4 is performed.

As shown in FIG. 4, when the three upper MOS-FETs among the six MOS-FETs included in the motor drive circuit 13 are turned on based on the PWM signals provided by the three-phase/PWM modulator 12 at a time point t1 at which one PWM period starts, each of the u-phase voltage Vp_u, the v-phase voltage Vp_v, the w-phase voltage Vp_w to be applied to the motor becomes equal to the voltage Vb at the both ends of the motor drive circuit. The voltage drops due to a resistance in the motor drive circuit 13 (for example, the on-resistance of the MOS-FET). However, to simplify the explanation, it is assumed that the voltage does not drop. As described above, the voltage applied to the motor does not drop at the time point t1.

Then, as shown in FIG. 4, when the MOS-FET for controlling the u-phase voltage Vp_u among the three upper MOS-FETs is turned off (that is, when the MOS-FET for controlling the u-phase voltage Vp_u among the three lower MOS-FETs is turned on) at a time point t2, the u-phase voltage Vp_u to be applied to the motor becomes equal to a ground potential. The lower MOS-FETs are turned off when the respective upper MOS-FETs are turned on, and the lower MOS-FETs are turned on when the respective upper MOS-FETs are turned off. The u-phase voltage Vp_u to be applied to the motor is not completely equal to the ground potential as described above. Since the two MOS-FETs for controlling the v-phase voltage Vp_v and the w-phase voltage Vp_w among the three upper MOS-FETs remain on at the time point t2, the u-phase current iu flows in the motor drive circuit 13 through wires and the like. Thus, the voltage applied to the motor decreases due to the above-described wiring resistance and the like. In FIG. 4, a voltage Vb1 indicates the decreased voltage at the both ends of the circuit. Accordingly, the v-phase voltage Vp_v and the w-phase voltage Vp_w also decrease to the voltage Vb1.

Then, as shown in FIG. 4, when the two MOS-FETs for controlling the u-phase voltage and the v-phase voltage among the three upper MOS-FETs are off (that is, when the two MOS-FETs for controlling the u-phase voltage and the v-phase voltage among the three lower MOS-FETs are turned on) at a time point t3, the v-phase voltage Vp_v to be applied to the motor also becomes equal to the ground potential, as well as the u-phase voltage Vp_u. As described above, the lower MOS-FETs are turned off when the respective upper MOS-FETs are turned on, and the lower MOS-FETs are turned on when the respective upper MOS-FETs are turned off. At the time point t3, the MOS-FET for controlling the w-phase voltage among the three upper MOS-FETs remains on. Therefore, the u-phase current iu and the v-phase current iv flow in the motor drive circuit 13 through the wires and the like. Therefore, the voltage applied to the motor further decreases due to the wiring resistance and the like. In FIG. 4, a voltage Vb2 indicates the voltage at the both ends of the circuit that has further decreased from the voltage Vb1. Accordingly, the w-phase voltage Vp_w also decreases to the voltage Vb2.

In this case, the v-phase voltage Vp_v decreases from the voltage Vb to the voltage Vb1 at the time point t2, and remains at the voltage Vb1 during the period T1 from the time point t2 to the time point t3. The decrease in the voltage is compensated for, by compensating for a decrease in the time average value of the v-phase voltage Vp_v during one PWM period. Accordingly, a control is executed so that the v-phase voltage Vp_v is maintained at the voltage Vb1 during a correction period ΔT1 from the time point t3, and then, the v-phase voltage Vp_v changes to the ground potential at a time point t4, although the v-phase voltage Vp_v would change to the ground potential at the time point t3 if the control were not executed. The calculation of the correction period ΔT1 will be described later.

FIG. 5 shows the v-phase voltage Vp_v after the decrease in the v-phase voltage Vp_v is compensated for. As shown in FIG. 5, the v-phase voltage Vp_v decreases to the voltage Vb1 at the time point t2, and the v-phase voltage Vp_v is maintained at the Vb1 until the time point t4. Then, the v-phase voltage Vp_v changes to the ground potential at the time point t4.

When the v-phase voltage Vp_v changes in the above-described manner, the w-phase voltage Vp_w also decreases to the voltage Vb1 at the time point t2, and the w-phase voltage Vp-_w remains at the voltage Vb1 during the period from the time point t2 to the time point t4 as shown in FIG. 5. Further, since only the MOS-FET for controlling the w-phase voltage among the three upper MOS-FETs is on at the time point t4, the w-phase voltage Vp-w decreases to the voltage Vb2 at the time point t4, as shown in FIG. 5. The decrease in the voltage is compensated for, by compensating for a decrease in the time average value of the w-phase voltage Vp_w (during one PWM period), as in the case where the decrease in the v-phase voltage Vp_v is compensated for. Accordingly, a control is executed so that the w-phase voltage Vp_w is maintained at the voltage Vb2 during a correction period ΔT2 from the time point t5, and then, the w-phase voltage Vp_w changes to the ground potential at a time point t6, although the w-phase voltage Vp_w would change to the ground potential at the time point t5 if the control were not executed. The calculation of the correction period ΔT2 will be described later.

As described above, an on-period in which the MOS-FET included in the motor drive circuit 13 is on (or an off-period in which the MOS-FET is off) is appropriately changed to compensate for the decrease in the time average value of each of the v-phase voltage Vp_v and the w-phase voltage Vp_w. Thus, it is possible to eliminate or suppress a decrease in control accuracy due to the wiring resistance and the like, and to drive the motor with high accuracy. Hereinafter, the change in the on-period will be specifically described.

Figure 6:
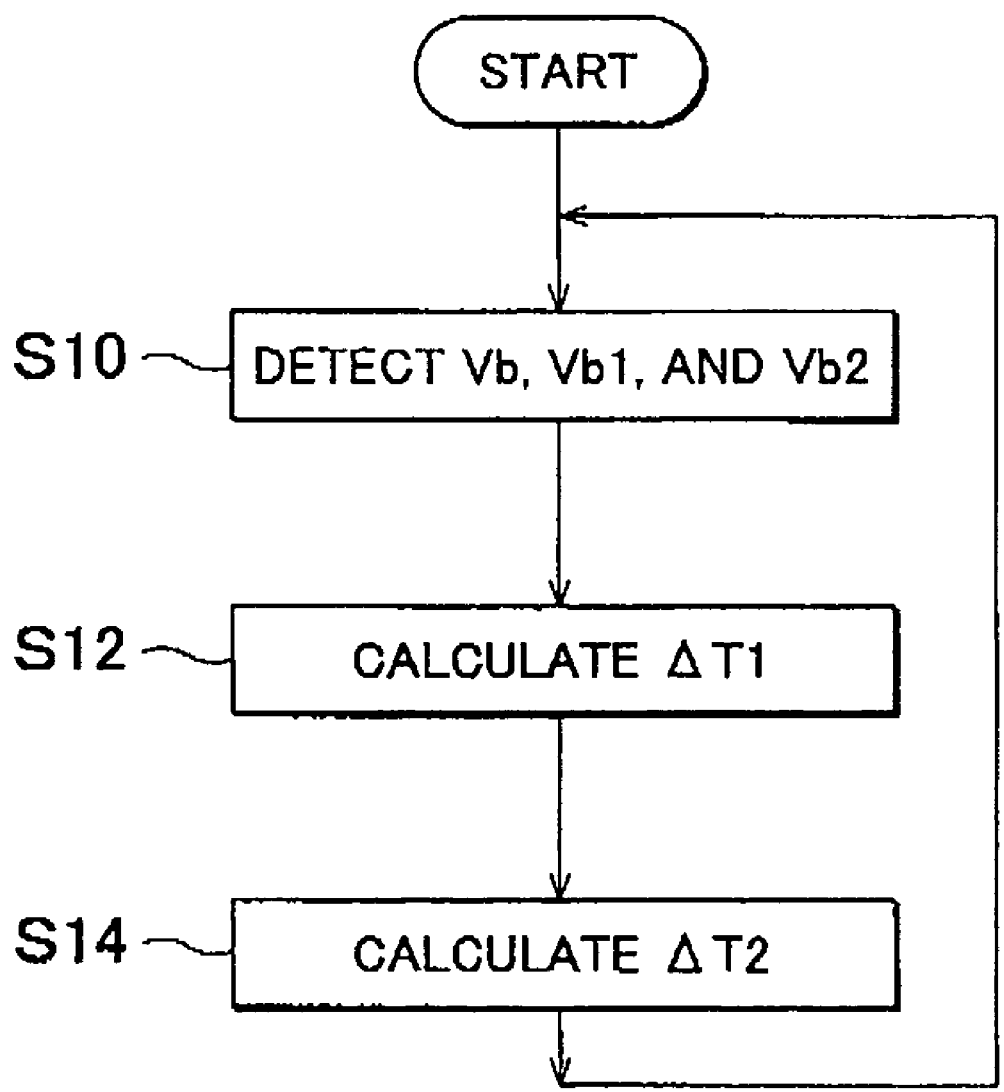
FIG. 6 is a flowchart showing the procedure of a control executed to perform the correction in the first embodiment.

FIG. 6 is a flowchart showing the procedure of a control executed to perform the above-described correction. In step S10 shown in FIG. 6, the three-phase voltage correction portion 29 acquires the voltage Vb at the both ends of the motor drive circuit 13 detected by the voltage sensor 16 during the period from the time point t1 to the time point t2, the decreased voltage Vb1 at the both ends of the circuit detected during the period from the time point t2 to the time point t3, and the further decreased voltage Vb2 at the both ends of the circuit detected during the period from the time point t4 to the time point t5. The values of the voltages Vb, Vb1, and Vb2 at the both ends of the circuit need not necessarily be detected at the same time. At least one of the voltage values may be detected in a next PWM period, or after the next PWM period.

Then, in step S12, the three-phase voltage correction portion 29 calculates the correction period ΔT1 from the time point t3 to the time point t4, by which the on-period is to be extended by performing correction, based on the period T1 from the time point t2 to the time point t3, and the voltage Vb and the voltage Vb1. More specifically, the decrease in the voltage from the voltage Vb to the voltage Vb1 during the period T1 is compensated for, by compensating for the decrease in the time average value of the v-phase voltage Vp_v during one PWM period. Therefore, a shaded area from the time point t2 to the time point t3 in FIG. 4 needs to be equal to a shaded area from the time point t3 to the time point t4 in FIG. 4. The shaded area from the time point t2 to the time point t3 is equivalent to the decrease in the time average value of the v-phase voltage Vp_v during one PWM period. This situation is expressed by the following equation (9).

$$(Vb-Vb1) \times T1 = Vb1 \times \Delta T1 \tag{9}$$

Accordingly, the following equation (10) for obtaining the correction period ΔT1 is derived by transforming the equation (9). Thus, the three-phase voltage correction portion 29 calculates the correction period ΔT1 using the equation (10).

$$\Delta T1 = (Vb-Vb1) \times T1/Vb1 \tag{10}$$

The three-phase voltage correction portion 29 corrects the v-phase command voltage Vv so that the time point, at which the v-phase voltage Vp_v changes to the ground potential, is postponed from the time point t3 to the time point t4, based on the calculated correction period ΔT1. The v-phase command voltage Vv is used to set the duty ratio of the PWM signal that is output from the three-phase/PWM modulator 12 to the MOS-FET for the v-phase. More specifically, in the three-phase/PWM modulator 12, a saw-tooth wave is generated. The potential of the saw-tooth wave linearly changes from the ground potential to a predetermined potential (the highest value of the command voltage in this case), and instantaneously returns from the predetermined potential to the ground potential, during one PWM period. The potential of the PWM signal V is an off-potential when the potential of the saw-tooth wave is higher than the v-phase command voltage Vv, and the potential of the PWM signal V is an on-potential when the potential of the saw-tooth wave is lower than the v-phase command voltage Vv. For example, the potential of the saw-tooth wave starts to linearly increase from the ground potential at the time point t1 in FIG. 4, and instantaneously returns from the predetermined potential to the ground potential at a time point (not shown) at which one PWM period ends after the time point t6. The manner in which the potential of the saw-tooth wave changes is determined in advance. The three-phase voltage correction portion 29 corrects the v-phase command voltage Vv so that the time point, at which the potential of the PWM signal changes to the off-potential (that is, the time point at which the v-phase voltage Vp_v changes to the ground potential), is postponed from the time point t3 to the time point t4. The three-phase/PWM modulator 12 may use a known triangle wave, instead of the saw-tooth wave. In this case, the off-periods are provided before and after the on-period. It is necessary to strictly set a timing at which the potential is detected by the voltage sensor 16. In the embodiment, the frequency of the saw-tooth wave is 20 kHz, and the PWM period is 50 μs.

Subsequently, in step S14, the three-phase voltage correction portion 29 calculates the correction period ΔT2 from the time point t5 to the time point t6, by which the on-period is to be extended by performing the correction, based on a period T2 from the time point t3 to the time point t5, the period T1, the correction period ΔT1, and the voltage Vb2. More specifically, both of the decrease in the voltage from the voltage Vb to the voltage Vb1 during the period from the time point t2 to the time point t4, and the decrease in the voltage from the voltage Vb to the voltage Vb2 during the period from the time point t4 to the time point t5 are compensated for, by compensating for the decrease in the time average value of the w-phase voltage Vp_w during one PWM period. Therefore, a shaded area from the time point t2 to the time point t5 in FIG. 5 needs to be equal to a shaded area from the time point t5 to the time point t6 in FIG. 5. The shaded area from the time point t2 to the time point t5 is equivalent to the decrease in the time average value of the w-phase voltage Vp_w during one PWM period. This situation is expressed by the following equation (11).

$$(Vb \times Vb1) \times (T1 + \Delta T1) + (Vb - Vb2) \times (T2 - \Delta T1) = Vb2 \times \Delta T2 \quad (11)$$

Accordingly, the following equation (12) for obtaining the correction period ΔT2 is derived by transforming the equation (11). Thus, the three-phase voltage correction portion 29 calculates the correction period ΔT2 using the equation (12).

$$\Delta T2 = ((Vb - Vb1) \times (T1 + \Delta T1) + (Vb - Vb2) \times (T2 - \Delta T1)) / Vb2 \quad (12)$$

The three-phase voltage correction portion 29 corrects the w-phase command voltage Vw so that the time point, at which the w-phase voltage Vp_w changes to the ground potential, is postponed from the time point t5 to the time point t6, based on the calculated correction period ΔT2. The w-phase command voltage Vw is corrected in the same manner as the manner in which the v-phase command voltage Vv is corrected, and therefore, the description of the correction manner will be omitted. After the w-phase command voltage Vw is corrected, the routine returns to step S10, and then, the above-described processes are executed in a cycle of one to several PWM periods until the motor stops (the routine returns from step S14 to step S10, and then, proceeds to steps S12 and S14).

Thus, the motor control apparatus according to the embodiment corrects the v-phase command voltage Vv and the w-phase command voltage Vw so that the time average value (or the time integral value) of the voltage to be applied to each of the v-phase and the w-phase of the motor if there is no voltage change due to the wiring resistance is substantially equal to the time average value (or the time integral value) of the voltage that is actually applied to a corresponding one of the v-phase and the w-phase of the motor (during one PWM period). Thus, it is possible to eliminate or suppress a decrease in the control accuracy due to the wiring resistance and the like, and to drive the motor with high accuracy.

In the motor control apparatus according to the embodiment, only one current sensor is provided. Since the number of current sensors is reduced, the size of the motor control apparatus, the cost, and the consumption of electric power are reduced. However, even when the motor control apparatus includes the current sensors for respective phases, it is possible to obtain the same advantageous effects. Also, although the motor control apparatus according to the embodiment uses the open-loop control, even when the motor control apparatus uses a feedback control, it is possible to obtain the same advantageous effects.

The configuration of an electric power steering apparatus according to a second embodiment of the invention is the same as that in the first embodiment shown in FIG. 1, and therefore, the description thereof will be omitted.

Figure 7:
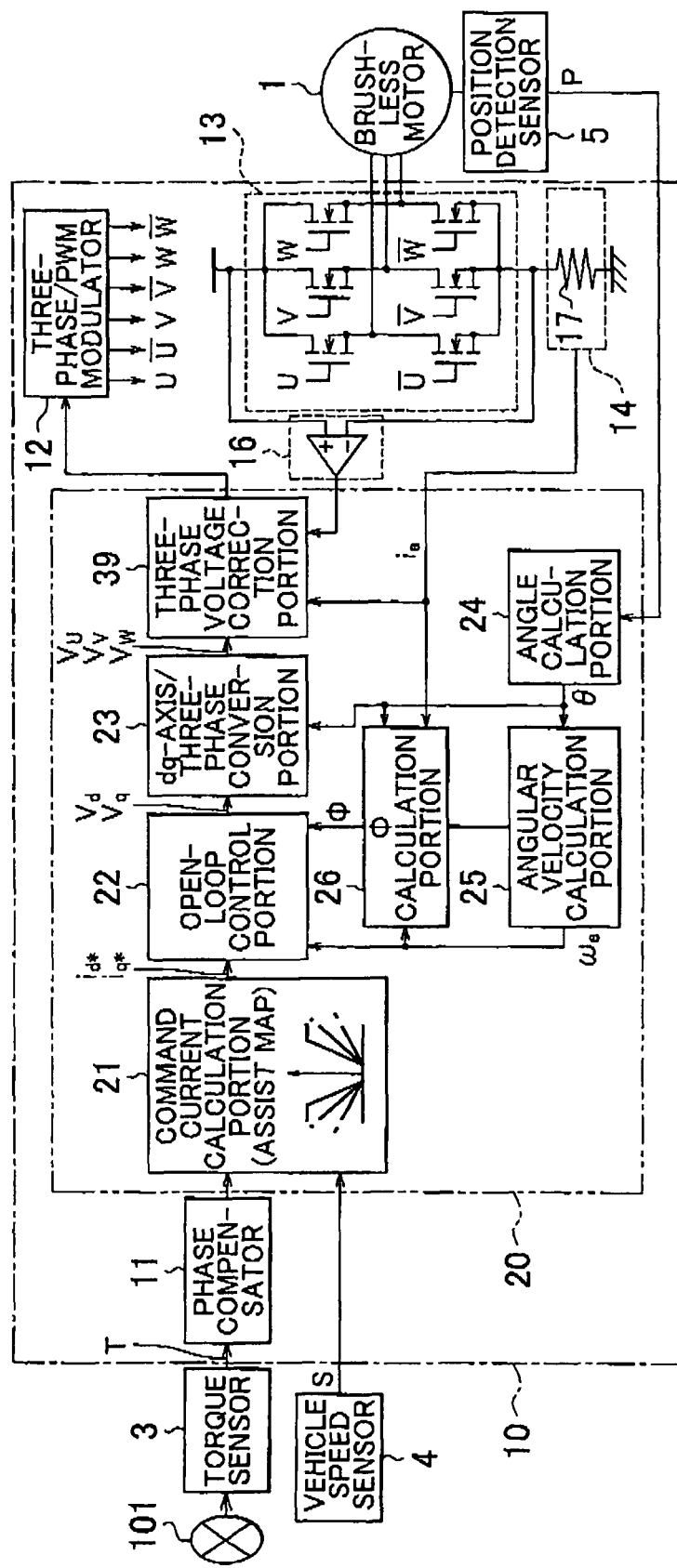
FIG. 7 is a block diagram showing the configuration of a motor drive control according to a second embodiment of the invention.

FIG. 7 is a block diagram showing the configuration of a motor control apparatus according to the second embodiment of the invention. As evident from comparison between the configuration in the second embodiment with the configuration in the first embodiment shown in FIG. 2, the operation of a three-phase voltage correction portion 39 in the second embodiment differs from the operation of the three-phase voltage correction portion 29 in the first embodiment, and the three-phase voltage correction portion 39 in the second embodiment acquires the current value ia detected by the current sensor 14, unlike the three-phase voltage correction portion 29 in the first embodiment. The other constituent elements in the second embodiment are the same as those in the first embodiment. Therefore, the same and corresponding constituent elements as those in the first embodiment are denoted by the same reference numerals, and the description thereof will be omitted.

Figure 8:
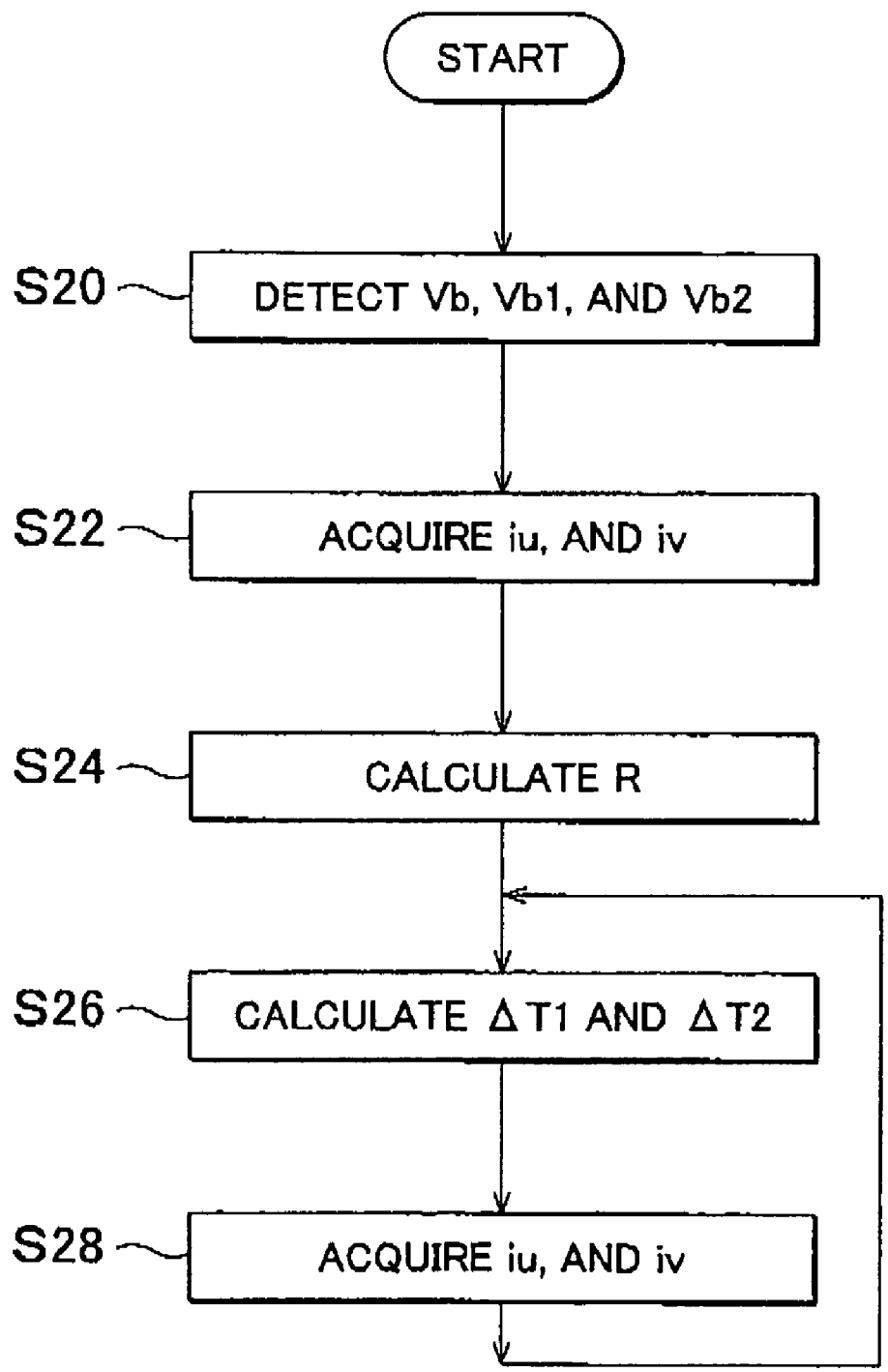
FIG. 8 is a flowchart showing the procedure of a control executed to perform correction in the second embodiment.

FIG. 8 is a flowchart showing the procedure of a control executed by the three-phase voltage correction portion 39 to perform correction in the second embodiment. In step S20 shown in FIG. 8, the three-phase voltage correction portion 39 acquires the voltage Vb at the both ends of the motor drive circuit 13 detected by the voltage sensor 16 during the period from the time point t1 to the time point t2 in FIG. 4, the decreased voltage Vb1 at the both ends of the circuit detected during the period from the time point t2 to the time point t3, and the further decreased voltage Vb2 at the both ends of the circuit detected during the period from the time point t3 to the time point t5. The acquisition of the voltage Vb1 or the acquisition of the voltage Vb2 may be omitted, as described later.

Next, in step S22, the three-phase voltage correction portion 39 acquires the u-phase current iu among the drive currents of three phases during the period from the time point t2 to the time point t3 in FIG. 4, based on the current value ia detected by the current sensor 14. Also, the three-phase voltage correction portion 39 acquires the sum of the u-phase current iu and the v-phase current iv that flow in the motor drive circuit 13 during the period from the time point t3 to the time point t5. The acquisition of the u-phase current iu or the acquisition of the sum of the u-phase current iu and the v-phase current iv may be omitted, as described later. In this embodiment, the voltage values are acquired in step S20 at the same time point as the time point at which the current values are acquired in step S22. However, the if there are not a sufficient number of A/D converters in the microcomputer 20, the voltage values may be acquired during the PWM period that is different from the PWM period during which the current values are acquired.

Subsequently, in step S24, the three-phase voltage correction portion 39 calculates a resistance R of wires and the like in a current path from the power supply to the both ends of the circuit (hereinafter, the resistance R will be simply referred to as "wiring resistance R"). As described above with reference to FIG. 4, the currents circulate in the motor drive circuit 13, and therefore, no current flows from the power supply to the wires and the like during the period from the time point t1 to the time point t2. The u-phase current iu flows during the period from the time point t2 to the time point t3, and the u-phase current iu and the v-phase current iv flow during the period from the time point t3 to the time point t5. Accordingly, the wiring resistance R is determined using the following equation (13) or the following equation (14).

$$R=(Vb-Vb1)/|iu| \quad (13)$$

$$R=(Vb-Vb2)/|(iu+iv)| \quad (14)$$

To prevent a detection error, the three-phase voltage correction portion 39 calculates the average value of the wiring resistances R calculated using the equations (13) and (14), as the wiring resistance R. The wiring resistance R may be calculated using only one of the equations (13) and (14). In this case, it is not necessary to detect the value of the voltage at the both ends of the circuit and the current value that are used in the equation that is not employed.

Next, in step S26, the three-phase voltage correction portion 39 calculates the correction period $\Delta T1$ from the time point t3 to the time point t4, by which the on-period is to be extended by performing the correction, based on the period T1 from the time point t2 to the time point T3, and the voltage Vb and the u-phase current iu. In this case, as in the first embodiment, the decrease in the voltage from the voltage Vb to the voltage Vb1 during the period T1 is compensated for, by compensating for the decrease in the time average value of the v-phase voltage Vp_v during one PWM period. Therefore, the shaded area from the time point t2 to the time point t3 in FIG. 4 needs to be equal to the shaded area from the time point t3 to the time point t4 in FIG. 4. The shaded area from the time point t2 to the time point t3 is equivalent to the decrease in the time average value of the v-phase voltage Vp_v during one PWM period. This situation is expressed by the following equation (15).

$$(R\times|iu|)\times T1=(Vb-(R\times|iu|))\times \Delta T1 \quad (15)$$

Accordingly, the following equation (16) for obtaining the correction period $\Delta T1$ is derived by transforming the equation (15). Thus, the three-phase voltage correction portion 39 calculates the correction period $\Delta T1$ using the equation (16).

$$\Delta T1=(R\times|iu|)\times T1/(Vb-(R\times|iu|)) \quad (16)$$

As in the first embodiment, the three-phase voltage correction portion 39 corrects the v-phase command voltage Vv so that the time point, at which the v-phase voltage Vp_v changes to the ground potential, is postponed from the time point t3 to the time point t4, based on the calculated correction period $\Delta T1$.

Also, the three-phase voltage correction portion 39 calculates the correction period $\Delta T2$ from the time point t5 to the time point t6, by which the on-period is to be extended by performing the correction, based on the period T2 from the time point t3 to the time point T5, the period T4, the correction period $\Delta T1$, and the u-phase current iu and the v-phase current iv. In this case, as in the first embodiment, it is necessary to compensate for the decrease in the time average value of the w-phase voltage Vp_w during one PWM period. Therefore, the shaded area from the time point t2 to the time point t5 in FIG. 5 needs to be equal to the shaded area from the time point t5 to the time point t6 in FIG. 5. The shaded area from the time point t2 to the time point t5 is equivalent to the decrease in the time average value of the w-phase voltage Vp_w during one PWM period. This situation is expressed by the following equation (17).

$$(R\times|iu|)\times(T1+\Delta T1)+(R\times|(iu+iv)|)\times(T2-\Delta T1)=(Vb-(R\times|(iu+iv)|))\times \Delta T2 \quad (17)$$

Accordingly, the following equation (18) for obtaining the correction period $\Delta T2$ is derived by transforming the equation (17). Thus, the three-phase voltage correction portion 39 calculates the correction period $\Delta T2$ using the equation (18).

$$\Delta T2=((R\times|iu|)\times(T1+\Delta T1)+(R\times|(iu+iv)|)\times(T2-\Delta T1))/(Vb-(R\times|(iu+iv)|)) \quad (18)$$

As in the first embodiment, the three-phase voltage correction portion 39 corrects the w-phase command voltage Vw so that the time point, at which the w-phase voltage Vp_w changes to the ground potential, is postponed from the time point t5 to the time point t6, based on the calculated correction period $\Delta T2$.

Subsequently, in step S28, the three-phase voltage correction portion 39 acquires the u-phase current iu and the v-phase current iv among the drive currents of three phases, based on the current value ia detected by the current sensor 14. As described above, the acquisition of the u-phase current iu or the acquisition of the sum of the u-phase current iu and the v-phase current iv may be omitted. After the detected currents are thus acquired, the routine returns to step S26. Then, the above-described processes are executed in a cycle of one to several PWM periods (the routine returns from step S28 to step S26, and then, proceeds to step S28). While the processes are repeated, the voltage Vb at the both ends of the circuit may be detected in an appropriate cycle, because the power supply voltage may change. It is described that the processes in step S20 to S24 are executed only once after the apparatus is started. However, since the wiring resistance R changes due to, for example, a change in ambient temperature or an increase in the temperature of the motor in actuality, it is preferable that the processes in steps S20 to S24 should be executed at appropriate time intervals, for example, once in several seconds. If a computation load does not cause any problem, the processes in steps S20 to S24 may be executed every time the correction values are calculated.

Thus, the motor control apparatus according to the second embodiment determines the wiring resistance R once, and then, corrects the v-phase command voltage Vv and the w-phase command voltage Vw so that the time average value of the voltage to be applied to each of the v-phase and the w-phase of the motor if there is no voltage change due to the wiring resistance is substantially equal to the time average value of the voltage that is actually applied to a corresponding one of the v-phase and the w-phase of the motor. Thus, after the wiring resistance R is calculated, it is possible to eliminate or suppress a decrease in the control accuracy due to the wiring resistance and the like, and to drive the motor with high accuracy, only by detecting the u-phase current iu and the v-phase current iv (without detecting the voltage using the voltage sensor 16), until the wiring resistance R is calculated again.

In the motor control apparatus according to the second embodiment, only one current sensor is provided. Since the number of current sensors is reduced, the size of the motor control apparatus, the cost, and the consumption of electric power are reduced. However, even when the motor control apparatus includes the current sensors for respective phases, it is possible to obtain the same advantageous effects. Also, although the motor control apparatus according to the embodiment uses the open-loop control, even when the motor control apparatus uses a feedback control, it is possible to obtain the same advantageous effects.

The configuration of an electric power steering apparatus according to a third embodiment of the invention is the same as that in the first embodiment shown in FIG. 1, and therefore, the description thereof will be omitted. The configuration of a motor control apparatus according to the third embodiment of the invention is the same as that in the second embodiment shown in FIG. 7. Therefore, the same and corresponding constituent elements as those in the second embodiment are denoted by the same reference numerals, and the description thereof will be omitted. In the third embodiment, the correction operation performed by the three-phase voltage correction portion 39 is the same as that in the second embodiment. However, the third embodiment differs from the second embodiment in that the three-phase voltage correction portion 39 performs the operation of limiting the correction result, and the operation of calculating a limit value in the third embodiment.

Figure 9:
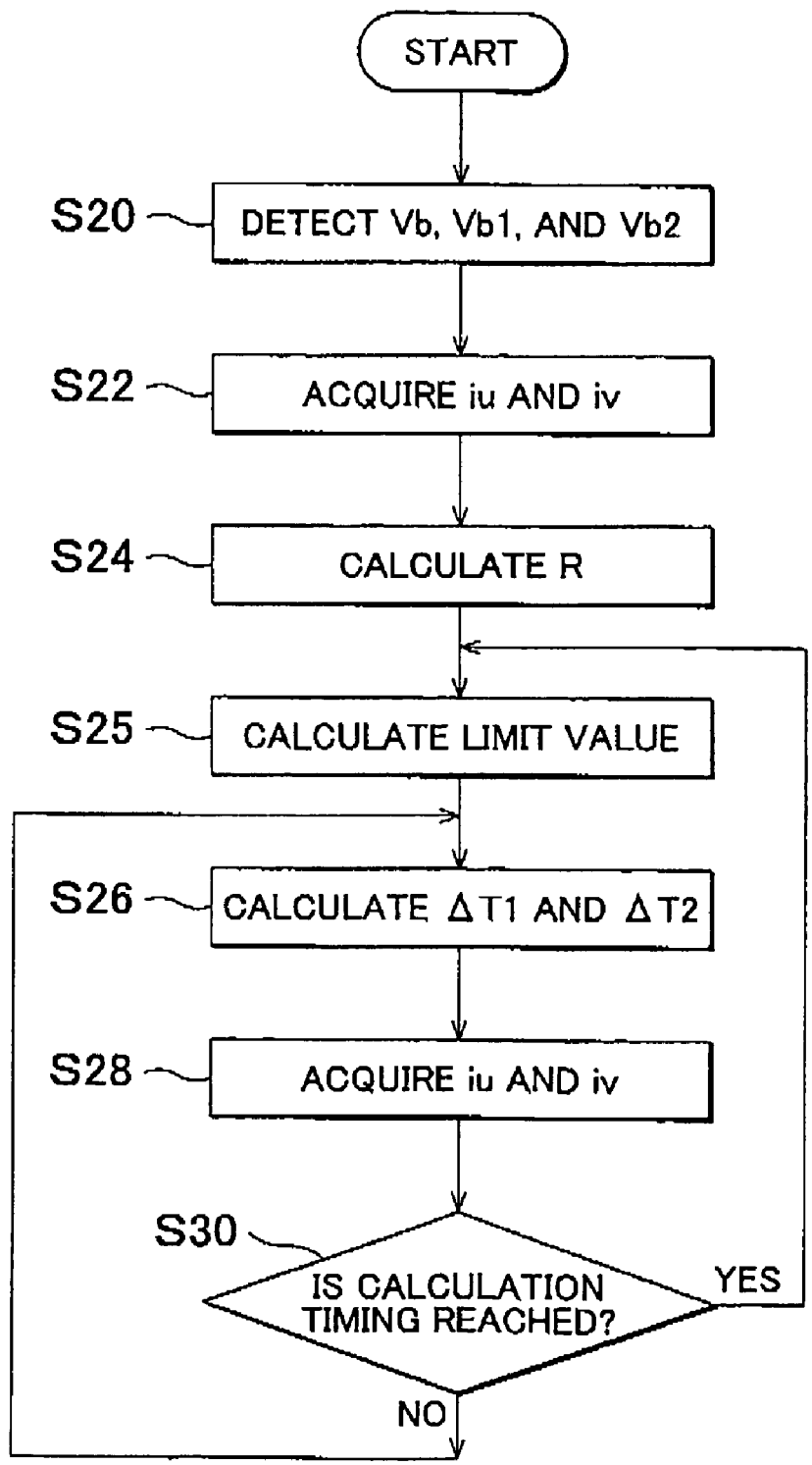
FIG. 9 is a flowchart showing the procedure of a control executed to perform correction in a third embodiment of the invention.

FIG. 9 is a flowchart showing the procedure of a control executed by the three-phase voltage correction portion 39 to perform the correction in the third embodiment. The processes in steps S20 to S24, S26, and S28 (the operation performed by the three-phase voltage correction portion 39) shown in FIG. 9 are the same as the processes in steps S20 to S24, S26, and S28 shown in FIG. 8, and therefore, the description thereof will be omitted.

As evident from comparison between the processes in steps shown in FIG. 9 and the processes in steps shown in FIG. 8, in the third embodiment, the process of calculating the limit value in step S25 is added to the processes in the second embodiment, and the process in step S25 is executed at an appropriate timing. More specifically, after the process in step S25 (described in detail later) is executed, the three-phase voltage correction portion 39 calculates the correction period ΔT1 and corrects the v-phase command voltage Vv, and calculates the correction period ΔT2 and corrects the w-phase command voltage Vw in step S26, as in the second embodiment. Then, the three-phase voltage correction portion 39 acquires the u-phase current iu and the v-phase current iv in step S28. Subsequently, the three-phase voltage correction portion 39 determines whether a calculation timing at which the limit value should be calculated is reached in step S30. More specifically, the three-phase voltage correction portion 39 counts the number of times that the correction process in step S26 is executed. If the number of times that the correction process is executed reaches a predetermined number of times (for example, several times), the three-phase voltage correction portion 39 determines that the calculation timing is reached. If it is determined that the calculation timing is reached (YES in step S30), the process of calculating the limit value in step S25 is executed. Then, the above-described operations are repeated (the routine returns from step S30 to step S25, and then, the routine proceeds to steps 26 to 30). If it is determined that the calculation timing is not reached (NO in step S30), the routine returns to step S26, and the above-described operations are repeated (the routine returns from step S30 to step S26, and then, the routine proceeds to steps 27 to 30). Thus, the routine is executed in a manner such that the limit value is not calculated every time the correction values are calculated, in order to reduce the computation load. Accordingly, if the computation load does not cause any problem (i.e., if the computation is completed within one PWM period), it is preferable that the limit value should be calculated every time the correction values are calculated, in order to increase the accuracy.

Next, two methods of calculating the limit value in step S25 will be described. In each of the two methods, the three-phase voltage correction portion 39 calculates the limit value so that the corrected on-period does not exceed the PWM period. The limit value is used to limit the uncorrected on-period. That is, the limit value is not used to limit the corrected on-period. The length of the uncorrected on-period may be limited, or the duty ratio indicating the ratio of the on-period to the entire period may be limited before the correction is performed. Also, the u-phase command voltage Vu, the v-phase command voltage Vv, and the w-phase command voltage Vw that are determined by the dq-axis/three-phase conversion portion 23 may be limited (before the correction is performed), or the d-axis command voltage vd and the q-axis command voltage vq that are determined by the open-loop control portion 22 may be limited (before the correction is performed).

To simplify the explanation, the limit value is described as a value used to limit the length of the uncorrected on-period. However, in actuality, the d-axis command voltage vd and the q-axis command voltage vq are limited, because it is easy to set limit values of the d-axis command voltage vd and the q-axis command voltage. In this case, the limit value is set so that the q-axis command voltage vq for making the duty ratio of the PWM signal equal to 50% is exactly zero. Therefore, in actuality, the limit value is set as an absolute value, that is, an upper limit value and a lower limit value are set.

Figure 10:
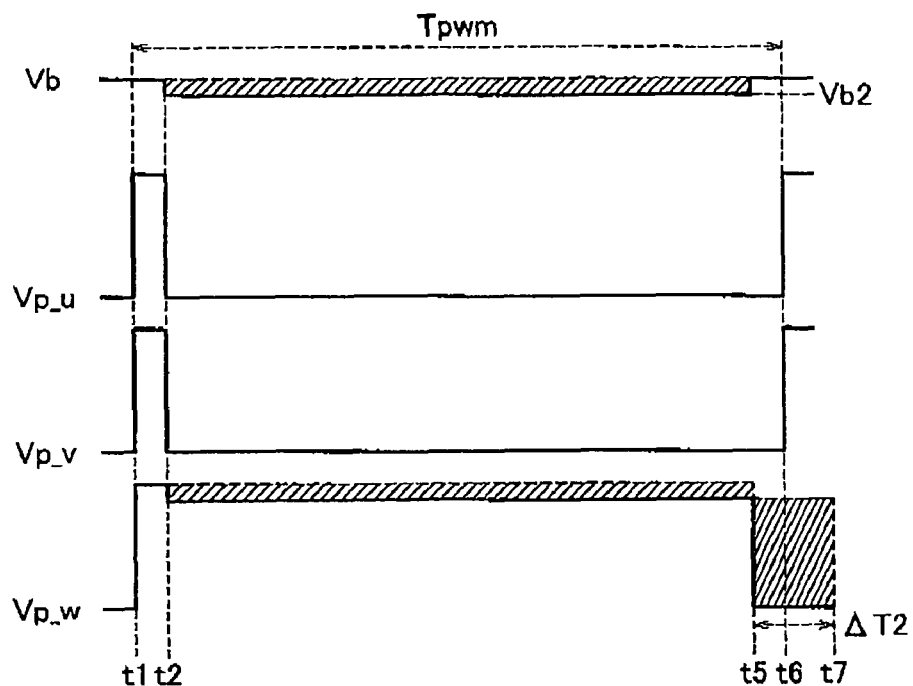
FIG. 10 is a diagram showing changes in voltages applied to the phases in the case where limitation using a limit value according to a first method is not performed in the third embodiment.

The first method of calculating the limit value will be described with reference to FIG. 10 and FIG. 11. FIG. 10 is a diagram showing changes in the voltage applied to the both ends of the motor drive circuit, changes in the voltages applied to the phases of the motor, and a manner in which the w-phase voltage is corrected with respect to the changes during one PWM period, in the case where the limitation using the limit value according to the first method is not performed. As shown in FIG. 10, the uncorrected on-period ends at the time point t5. After the correction is performed in the manner according to the second embodiment, the corrected on-period ends at a time point t7. Since one PWM period Tpwm is a period from the time point t1 to the time point t6, the on-period ends in the next PWM period, although the on-period should be within one PWM period. Thus, a control state becomes abnormal. By performing the correction according to the first method, it is possible to eliminate the abnormal control state, as shown in FIG. 11.

Figure 11:
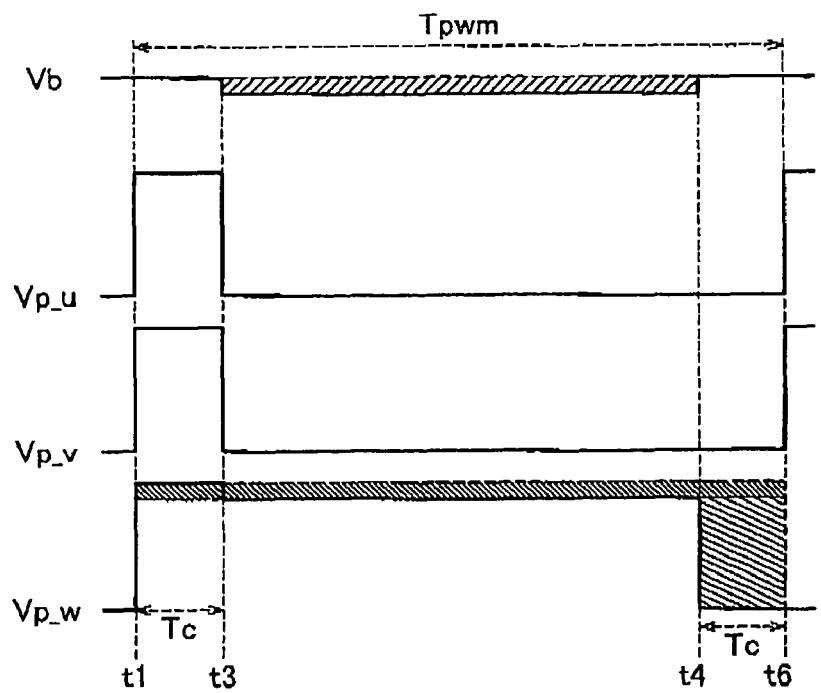
FIG. 11 is a diagram showing changes in the voltages applied to the phases in the case where the limitation is performed using the limit value according to the first method in the third embodiment.

FIG. 11 is a diagram showing changes in the voltage applied to the both ends of the motor drive circuit, changes in the voltages applied to the phases of the motor, and a manner in which the w-phase voltage is corrected with respect to the changes during one PWM period, in the case where the limitation is performed using the limit value according to the first method. As shown in FIG. 11, the corrected on-period ends at the time point t4 that is earlier than the time point t6 at which the PWM period ends, by a limitation period Tc (described later). Accordingly, the corrected on-period does not exceed the PWM period, and thus, the control state does not become abnormal. The method of calculating the limitation period Tc will be described in detail.

In the example shown in FIG. 10, the on-period for the u-phase and the on-period for the v-phase are extremely short, and the on-period for the u-phase and the on-period for the v-phase end at the same time point. Therefore, the u-phase current iu does not flow in the above-described on-period, unlike the case shown in FIG. 4. The voltage drop is caused only by the flow of the u-phase current iu and the v-phase current iv (that is, the flow of a negative w-phase current –iw) during the extremely long on-period for the w-phase. If the assumption is made that the on-period for the u-phase and the on-period for the v-phase are zero, and the on-period for the w-phase is equal to one PWM period, the correction period $\Delta T2$ becomes longest, as described in the first or second embodiment.

Accordingly, the limitation period Tc needs to be set so that the corrected on-period is within the PWM period even when the correction is performed based on the longest correction period $\Delta T2$. Accordingly, if a shaded area from the time point t1 to the time point t6 in FIG. 11 is equal to a shaded area from the time point t4 to the time point t6 in FIG. 11, it is possible, at least, to prevent the corrected on-period from exceeding the PWM period. The shaded area from the time point t1 to the time point t6 in FIG. 11 is a shaded area when the correction period $\Delta T2$ is longest. This situation is expressed by the following equation (19).

$$(R \times |iw|) \times Tpwm = (Vb - (R \times |iw|)) \times Tc \quad (19)$$

Accordingly, the following equation (20) for obtaining the correction period Tc is derived by transforming the equation (19). Thus, the three-phase voltage correction portion 39 calculates the correction period Tc using the equation (20).

$$Tc = (R \times |iw|) \times Tpwm / (Vb - (R \times |iw|)) \quad (20)$$

If the assumption is made that the on-period for the u-phase and the on-period for the v-phase are zero, and the on-period for the w-phase is equal to one PWM period, the on-period for the w-phase becomes longest. Thus, the assumption is useful for easily calculating the limit value that makes a margin largest. However, in most cases, the on-period for the w-phase is not equal to one PWM period. Therefore, instead of using the PWM period Tpwm in the equations (19) and (20), the sum of the period T1 and the period T2 that corresponds to the correction period (during a previous PWM period, for example, an immediately preceding PWM period) in the first or second embodiment may be used. Also, the limitation period Tc may be determined by referring to the equation (17). If the actual correction period is used, the limit value may make the margin small. Therefore, a period obtained by adding a predetermined period to the correction period, or a period obtained by multiplying the correction period by a predetermined rate may be used. That is, a period set to be in a range in which the actual correction period (the margin is smallest) is the minimum value and one PWM period (the margin is largest) is the maximum value may be used. In this case, it is possible to easily determine the limit value that makes the margin large to some degree. Further, the limitation period Tc may be calculated based on, typically, a value obtained by multiplying the voltage value obtained by multiplying the current value by the resistance value, by the difference between the maximum on-period of the PWM signal permitted in the design of the apparatus, and the minimum on-period permitted in the design of the apparatus. In this case, the limitation is eased, and thus, the on-period is increased as compared to the case where the limitation period is calculated based on one PWM period.

The three-phase voltage correction portion 39 limits the w-phase command voltage Vw output from the three-phase/PWM modulator 12 so that the w-phase voltage Vp_w changes to the ground potential at the time point t4 at the latest, based on the calculated limitation period Tc. As described above, the w-phase command voltage Vw is output from the three-phase/PWM modulator 12 to the MOS-FET for the w-phase, and the w-phase command voltage Vw is used to set the duty ratio of the PWM signal. Therefore, the limit value of the w-phase command voltage Vw is easily calculated. The voltage value exceeding the limit value is limited to the limit value. The limit value is also used for the voltages of the other phases.

As described above, in actuality, the q-axis command voltage vq is limited so that the w-phase voltage Vp_w changes to the ground potential at the time point t4 at the latest, because it is easy to limit the q-axis command voltage vq. In this case, since the q-axis command voltage vq for making the duty ratio of the above-described PWM signal equal to 50% is exactly zero, the limit value is set as an absolute value in actuality. More specifically, as shown in FIG. 11, the q-axis command voltage vq is limited so that the voltage of each phase changes to the ground potential at the time point t3 at the earliest, and at the time point t4 at the latest. The time point t3 is later than the time point t1 by the limitation period Tc. In the embodiment, the q-axis command voltage vq for making the duty ratio of the above-described PWM signal equal to 50% is set to exactly zero. However, this method of setting the q-axis command voltage vq is an example, that is, the invention is not limited to this method.

Figure 12:
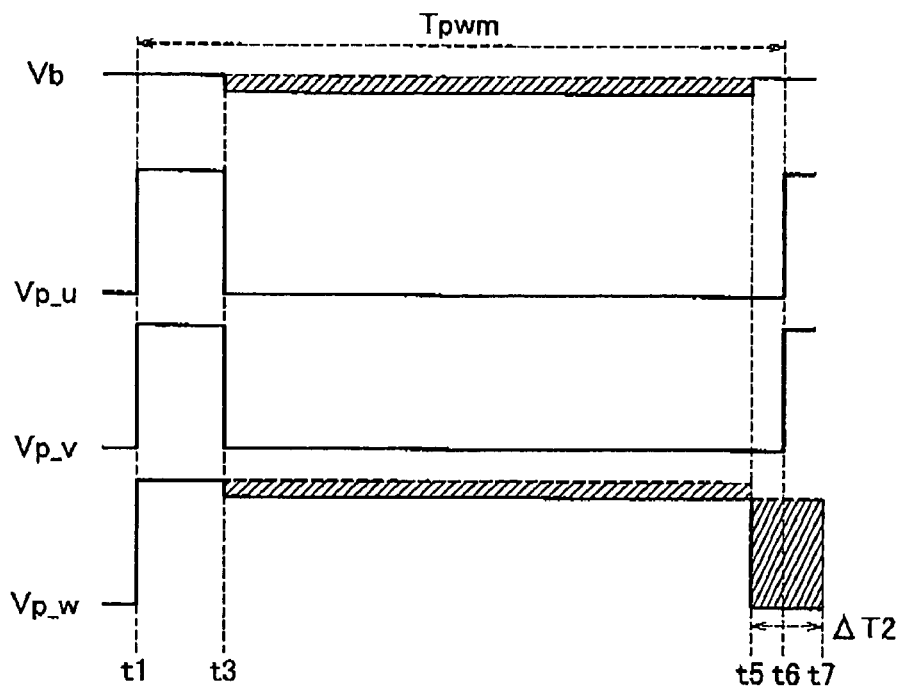
FIG. 12 is a diagram showing changes in the voltages applied to the phases in the case where limitation using a limit value according to a second method is not performed in the third embodiment.

Next, correction for eliminating the abnormal control state as shown in FIG. 12 using the second method will be described with reference to FIG. 13. While the above-described first method is a simple method, the second method described below is more complicated than the first method. However, in the case where the second method is used, it is possible to set the limit value to a less stringent value (a value close to the minimum value or the maximum value), as compared to the case where the first method is used. Therefore, it is possible to increase the on-period.

FIG. 12 is a diagram showing changes in the voltage applied to the both ends of the motor drive circuit, changes in the voltages applied to the phases of the motor, and a manner in which the w-phase voltage is corrected with respect to the changes during one PWM period, in the case where the limitation using the limit value according to the second method is not performed. In the example shown in FIG. 12, the uncorrected on-period for the u-phase and the uncorrected on-period for the v-phase end at the time point t3, unlike the example shown in FIG. 10. Otherwise, the example shown in FIG. 12 is substantially the same as the example shown in FIG. 10. The corrected on-period ends at the time point t7 that is later than the time point t6 at which one PWM period ends. Thus, the control state becomes abnormal. Accordingly, by performing the correction using the second method, it is possible to eliminate the abnormal control state shown in FIG. 12.

Figure 13:
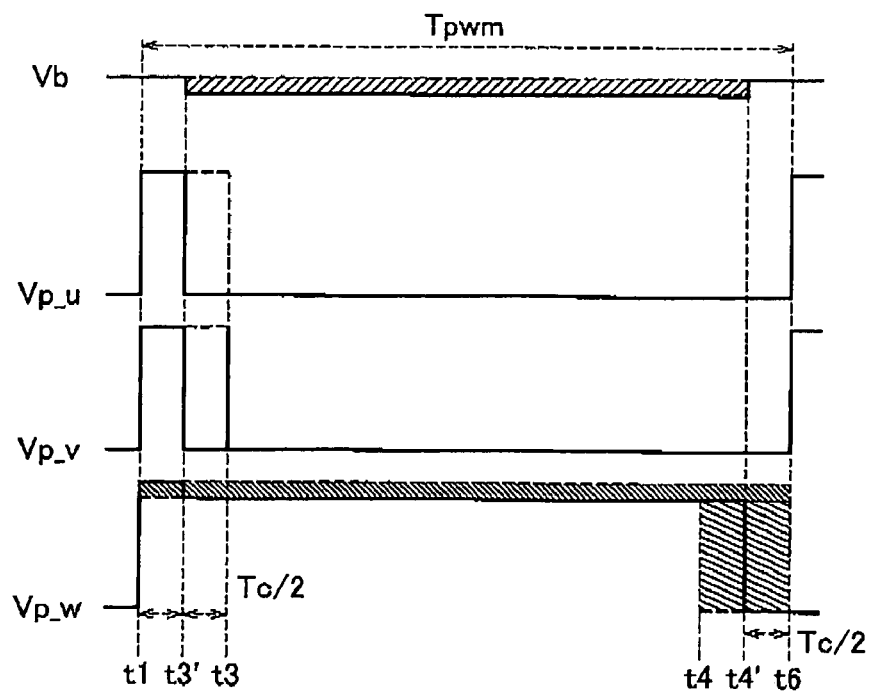
FIG. 13 is a diagram showing changes in the voltages applied to the phases in the case where the limitation is performed using the limit value according to the second method in the third embodiment.

FIG. 13 is a diagram showing changes in the voltage applied to the both ends of the motor drive circuit, changes in the voltages applied to the phases of the motor, and a manner in which the w-phase voltage is corrected with respect to the changes during one PWM period, in the case where the limitation is performed using the limit value according to the second method. As shown in FIG. 13, the corrected on-period ends at a time point t4' that is earlier than the time point t6 at which the PWM period ends by a half (Tc/2) (described later) of the limitation period Tc. Accordingly, in this situation, the corrected on-period may exceed the PWM period, although the limitation period can be set in a manner such that the limitation is eased. Therefore, correction is performed to subtract a half (Tc/2) of the limitation period Tc, from the on-period for each phase (this correction relates to setting of the limit value). Thus, the corrected on period is prevented from exceeding the PWM period. Since a half (Tc/2) of the limitation period Tc is obtained by dividing the limitation period Tc determined using the equation (20) by 2, the method of calculating a half (Tc/2) of the limitation period Tc will be omitted. Instead of subtracting a half (Tc/2) of the limitation period Tc from the on-period for each phase, a period equivalent to a half of the actual correction period may be subtracted from the on-period for each phase. Further, a period equivalent to a half of a period set to be in a range in which the actual correction period is the minimum value and the limitation period is the maximum value may be subtracted from the on-period for each phase. In this case, it is possible to prevent the corrected on-period from exceeding the PWM period while further increasing the corrected on-period.

Thus, the three-phase voltage correction portion 39 limits the w-phase command voltage Vw output from the three-phase/PWM modulator 12 so that the w-phase voltage Vp_w changes to the ground potential at the time point t4' at the latest, based on the calculated Tc. In addition, the three-phase voltage correction portion 39 performs the correction (relating to the setting of the limit value) to correct the u-phase command voltage Vu, the v-phase command voltage Vv, and the w-phase command voltage Vw so that the on-period for each phase is decreased by a half (Tc/2) of the limitation period Tc.

Even when the on-periods for the phases are increased or decreased by the same period, the control of the motor is not influenced, because when the voltages applied to the three phases are changed by the same amount, no interphase voltage changes, as shown by the following equation (21).

$$(Vp\_u-Tc/2)-(Vp\_v-Tc/2)=Vp\_u-Vp\_v \qquad (21)$$

The method, in which the q-axis command voltage vq for making the duty ratio of the PWM signal equal to 50% is set to exactly zero, is an example, and the invention is not limited to this method. However, if the limit value is set as an absolute value, the on-period for each phase is set to at least a half (Tc/2) of the limitation period Tc, that is, the on-period for each phase is set to be equal to or longer than a half (Tc/2) of the limitation period Tc. Therefore, it is possible to perform, without fail, the above-described correction for the u-phase command voltage Vu, the v-phase command voltage Vv, and the w-phase command voltage Vw so that the on-period for each phase is decreased by a half (Tc/2) of the limitation period Tc. Therefore, the above-described configuration is appropriate.

As described above, the motor control apparatus according to the third embodiment limits the on-period for each phase using the limit value so that the on-period for each phase is within one PWM period. Thus, it is possible to avoid an abnormal control state. Also, it is possible to eliminate or suppress a decrease in the control accuracy due to the wiring resistance and the like, and to drive the motor with high accuracy.

Although the current sensor 14 is provided in the first embodiment, if the Φ calculation portion 26 is omitted, the current sensor 14 may be omitted. Also, in the second embodiment, the current sensor 14 may be omitted in the cases described below. That is, in the second and third embodiments, the three-phase voltage correction portion 39 performs the correction based on the u-phase current iu and the v-phase current iv that are detected by the current sensor 14. However, instead of using the detected u-phase current iu and the detected v-phase current iv, estimated values of the u-phase current and the v-phase current, that is, an estimated u-phase current iua and an estimated v-phase current iva may be calculated using a known method, and the correction may be performed based on the estimated values that are calculated. As the method of calculating the estimated values, for example, a method using an adaptive observer that estimates an output current based on a voltage input to a drive circuit (inverter) is known.

Also, the correction may be performed based on the u-phase command current iu* and the v-phase command current iv* that are obtained by converting the d-axis command current id* and the q-axis command current iq* calculated by the command current calculation portion 21 to command currents on the three-phase AC coordinate axes, instead of performing the correction based on the estimated values. In these cases, the current sensor 14 may be omitted.

In each of the first to third embodiments, the correction is performed to increase the duty ratio (i.e., to increase the extension period by which the on-period is extended) based on the ground potential (more specifically, the connection point of the three lower phases in the motor drive circuit 13). However, the correction may be performed to decrease the duty ratio (i.e., to increase a shortening period corresponding to the extension period, i.e., a period by which the on-period is shortened) based on the connection point of the three upper phases in the motor drive circuit 13. In this case, contrary to the first to third embodiments, the voltage applied to the both ends of the motor drive circuit 13 increases due to the wiring resistance. Therefore, the u-phase command voltage Vu and the v-phase command voltage Vv are corrected to compensate for the increase in the time average values of the u-phase voltage Vp_u and the v-phase voltage Vp_v. Thus, it is possible to eliminate or suppress a decrease in the control accuracy due to the wiring resistance and the like, and to drive the motor with high accuracy. The correction period used for the compensation or the limitation period is easily calculated by referring to the calculation methods described in the first to third embodiments. In this case, the minimum on-period needs to be equal to or greater than zero. Also, contrary to the third embodiment, correction (relating to the setting of the limit value) is performed to add the limitation period to the on-period for each phase.

In each of the first to third embodiments, the open-loop control portion 22 executes the open-loop control. However, a feedback control may be executed based on the detected values of currents flowing into the motor. The feedback control is executed to eliminate the deviation of the detected current values from the command current values due to the wiring resistance and the like, unlike a general open-loop control. In this case as well, it is possible to eliminate or suppress in advance a decrease in the control accuracy due to the wiring resistance and the like using the above-described configuration. As a result, it is possible to drive the motor with high accuracy without delay. In each of the first to third embodiments, the three-phase motor is described. However, the invention may also be applied to a motor with n-phases (n is a natural number equal to or larger than 3).

In each of the first to third embodiments, the voltage sensor 16 includes a differential amplifier, and the output terminal of the voltage sensor 16 is connected to the three-phase voltage correction portion 29. However, an electronic component constituting the differential amplifier, more specifically, an operational amplifier or the like is relatively expensive, and a certain space is required to install the operational amplifier or the like. Thus, the cost and size of the apparatus may increase. Therefore, the configuration may be such that the voltage at the both ends of the motor drive circuit 13 is input to an A/D conversion circuit (not shown) of the microcomputer 20 directly or via a detection circuit such as a simple level-shift circuit. Hereinafter, the configuration will be described as a modified example of the first embodiment, with reference to FIG. 14.

Figure 14:
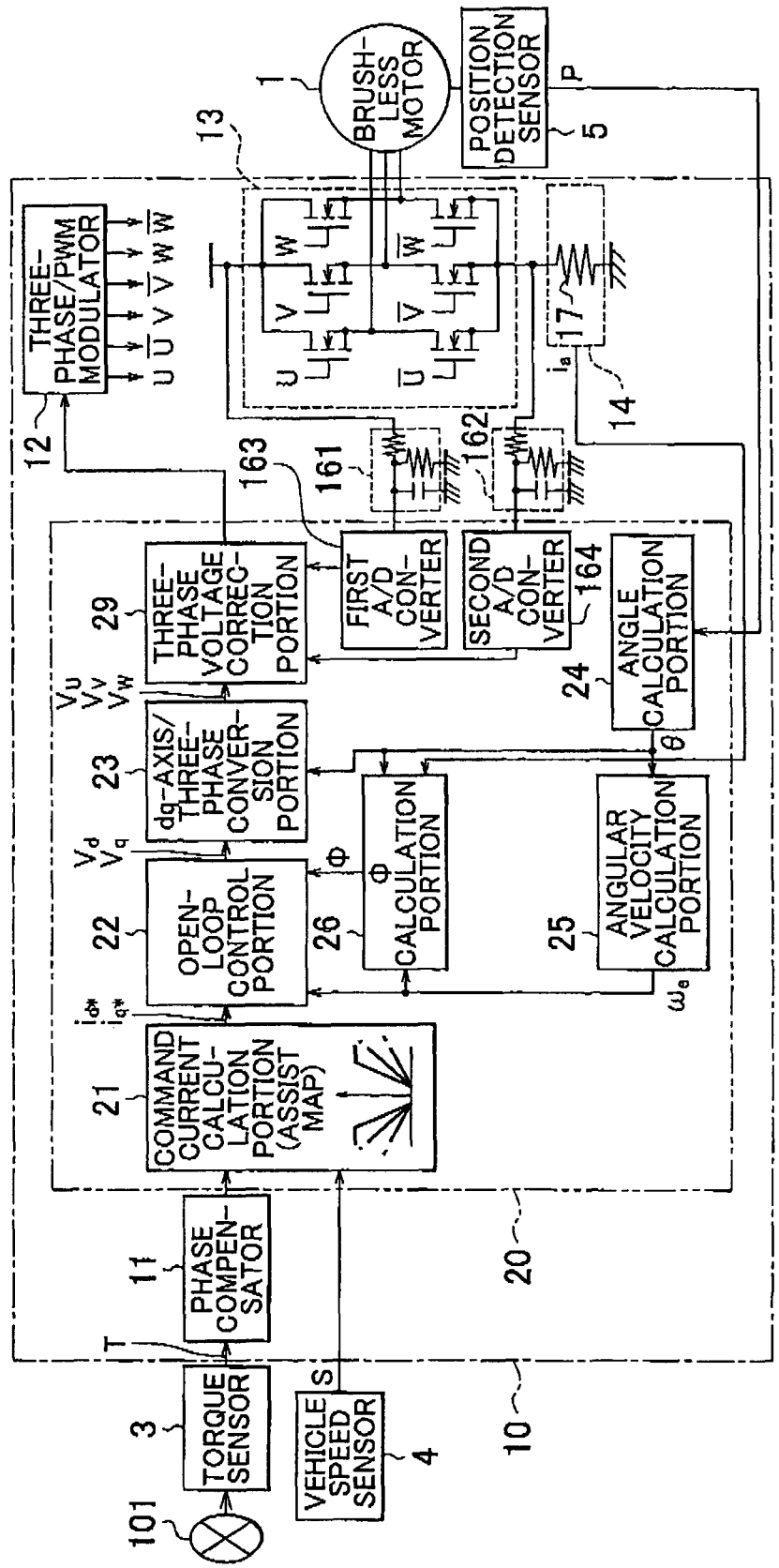
FIG. 14 is a block diagram showing the configuration of a motor control apparatus that acquires each of voltage values at both ends of the motor drive circuit in a modified example of the embodiment.

FIG. 14 is a block diagram showing the configuration of a motor control apparatus in a modified example of the first embodiment. The motor control apparatus in the modified example of the first embodiment acquires each of voltage values at the both ends of the motor drive circuit. A first A/D converter 163 and a second A/D converter 164 are provided in the microcomputer 20 included in the motor control apparatus. An input terminal of the first A/D converter 163 is connected between the motor drive circuit 13 and the positive electrode side of the power supply via a first resistance voltage divider circuit 161 including a capacitor. An input terminal of the second A/D converter 164 is connected between the motor drive circuit 13 and the shunt resistance 17 via a second resistance voltage divider circuit 162 including a capacitor.

Each of the first and second resistance voltage divider circuits 161 and 162 shifts the voltage level to a level appropriate for input to a corresponding one of the first and second A/D converters 163 and 164. Each of the first and second resistance voltage divider circuits 161 and 162 smoothes an input signal using the capacitor provided therein. Each of first and second resistance voltage divider circuits 161 and 162 need not necessarily include two resistance elements and a capacitive element. However, by employing the circuit with the simple configuration, it is possible to reduce manufacturing cost.

The three-phase voltage correction portion 29 receives the voltage value, which has been converted to a digital value, at one end of the motor drive circuit 13 close to the positive electrode side of the power supply, from the first A/D converter 163. At the same time, the three-phase voltage correction portion 29 receives the voltage value, which has been converted to a digital value, at one end of the motor drive circuit 13 close to the negative electrode side of the power supply, from the second A/D converter 164. The three-phase voltage correction portion 29 acquires the voltage at the both ends of the motor drive circuit 13 by calculating the difference between the voltage values. Accordingly, the first resistance voltage divider circuit 161 and the first A/D converter 163 function as a voltage detector. The second resistance voltage divider circuit 162 and the second A/D converter 164 function as another voltage detector. The three-phase voltage correction portion 29 functions as a calculator that calculates the difference between the voltage values detected by the voltage detectors. Thus, by employing the simple circuit configuration, it is possible to reduce the cost and size of the apparatus, as compared to the case where the operational amplifier or the like is used.

In the case where only one A/D converter is provided in the microcomputer 20, an output terminal of one of the first and second resistance voltage divider circuits 161 and 162 may be connected to the A/D converter, and a sample hold circuit may be provided between the other of the first and second resistance voltage divider circuits 161 and 162 and the A/D converter. The sample hold circuit maintains the voltage for a predetermined time. In this case, the A/D converter acquires the voltage values at the same time point in a manner such that there is a predetermined difference between time points at which the A/D converter acquires the voltage values. Also, in the case where the sample hold circuit is not provided, the A/D converter may sequentially acquire signals from the two output terminals in a manner such that there is a relatively small difference between time points at which the A/D converters acquires the signals, and when the influence of the time difference is small, that is, when the rotation speed of the motor is low, the signals are used to perform computation for the correction.

In the second or third embodiment, the wiring resistance R is measured by using the voltage measured by the voltage sensor 16 while the apparatus is operating. However, the wiring resistance R may be calculated by measuring each voltage between measurement points as shown in FIG. 15, when the apparatus is manufactured.

Figure 15:
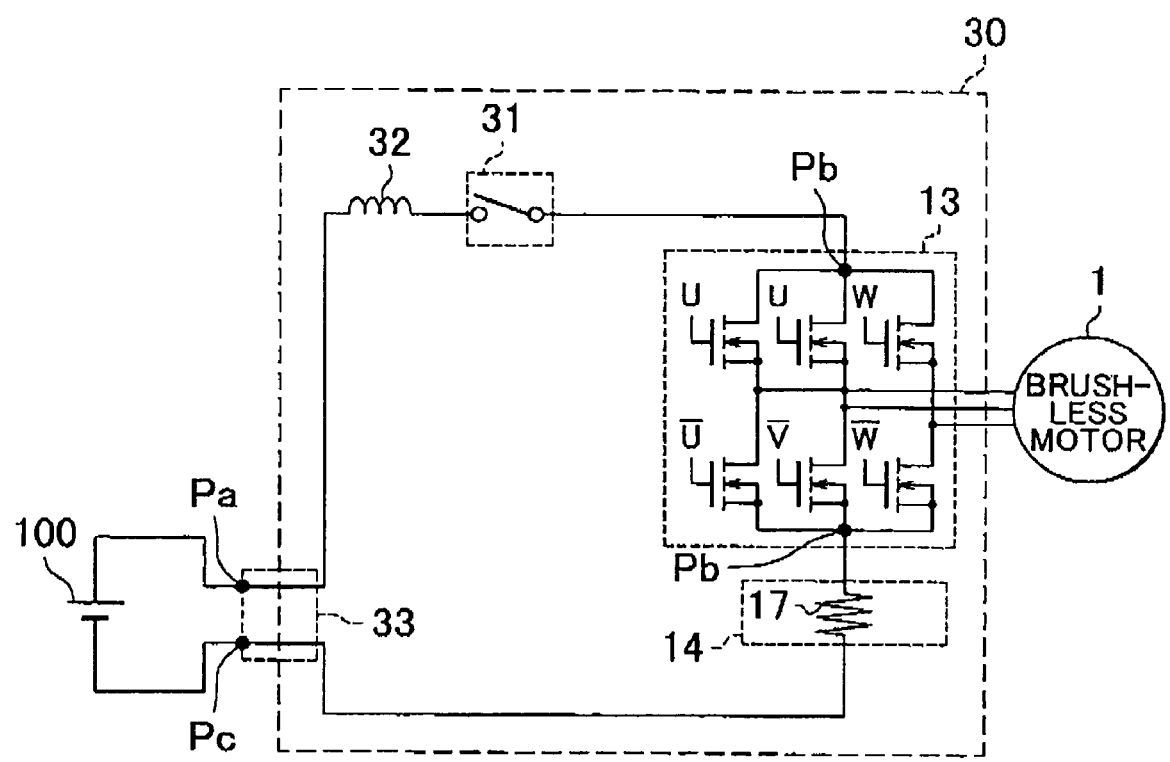
FIG. 15 is a circuit diagram showing measurement points for a motor drive circuit board in a modified example of the embodiment.

FIG. 15 is a circuit diagram showing measurement points for a motor drive circuit board. As shown in FIG. 15, a motor drive circuit board 30 including the motor drive circuit 13 is connected to the phases of the brushless motor 1 using motor wires, and connected to the vehicle-mounted battery 100 via a connector 33 using power supply wires.

Accordingly, the wiring resistance in the motor drive circuit board 30 is easily determined using the sum of a wiring resistance including the resistance of a relay 31 and the (equivalent) resistance of a coil 32 between a measurement point Pa and a measurement point Pb, and a wiring resistance including the shunt resistance 17 between a measurement point Pc and a measurement point Pd. Accordingly, it is possible to easily calculate the wiring resistance of each phase, by measuring the voltage between the two measurement points Pa and Pb, and the voltage between the two measurement points Pc and Pd, while a predetermined current flows.

After the wiring resistance R is calculated when the apparatus is manufactured in the above-described manner, the three-phase voltage correction portion 39 stores the value of the wiring resistance R in a storage portion (not shown) that includes, for example, a flash memory. More specifically, the value of the wiring resistance R is written in the memory when the apparatus is manufactured. In this case, it is not necessary to calculate the wiring resistance R when the apparatus is operating, unlike the second or third embodiment. Therefore, it is possible to omit the current sensor 16, and to reduce the computation load, as compared to the second or third embodiment.

The current to be supplied to the motor drive circuit board to calculate the resistance value at the time of manufacturing is not particularly limited, as long as the value of the current is appropriate for measurement. For example, a current that should flow to the motor drive circuit board if the apparatus is actually operating, or a current that actually flows to the motor drive circuit board when the apparatus is actually operating may be used. Further, although the voltage value and the current value are measured using a measurement device (used for conducting a test) outside the apparatus in this case, sensors (not shown) provided in the motor drive circuit board 30, the current sensor 14, and the voltage sensor 16 may be used. In the case where the voltage sensor 16 is used, if the processes in steps S20 to S24 in FIG. 8 are executed only once when the apparatus is manufactured, it is possible to obtain the same advantageous effects as those obtained in the second (or third) embodiment, using the same configuration as that in the second (or third) embodiment. The value of the wiring resistance R calculated based on the values measured at this time is stored in the above-described storage portion that includes, for example, a flash memory.

In the second or third embodiment as well, the measurement and the calculation are performed in the same manner (although, the timings at which the measurement and the calculation are performed are different from those in the above-described case). That is, as described above, it is preferable that the processes in steps S20 to S24 should be executed at appropriate time intervals, for example, once in several seconds, in the second or third embodiment. Accordingly, unless the processes in steps S20 to S24 are executed every time the correction value is calculated, it is preferable that the resistance value should be calculated at time intervals (for example, at time intervals of several seconds) longer than the time intervals at which the correction value is calculated, the calculated resistance value should be stored in the storage portion such as a flash memory, and the correction process in step S26 should be executed based on the resistance value stored in the storage portion and the current value when the resistance value is not calculated. Thus, it is possible to reduce the computation load of the microcomputer 20 by reducing the number of times that the resistance value is calculated.

In each of the configurations in the second and third embodiments, and the modified examples thereof, the value of the wiring resistance R to be stored is calculated based on the voltage value and the current value that are actually measured. However, the voltage value and the current value may be calculated, instead of actually measuring the voltage value and the current value. More specifically, for example, the resistance value between the measurement point Pa and the measurement point Pb shown in FIG. 15 is calculated by summing the designed resistance value of the relay 31 that is used (i.e., the resistance value of the relay 31 described in a catalog), the designed (equivalent) resistance value of the coil 32, the resistance value of copper pattern wiring of the motor drive circuit 30, and the designed resistance values of the connector 33 and components (not shown) such as a bus bar. The value of the wiring resistance R may be determined through, for example, numeric simulation and experiment, or the wiring resistance R may be a resistance value used in the design.

Figure 16:
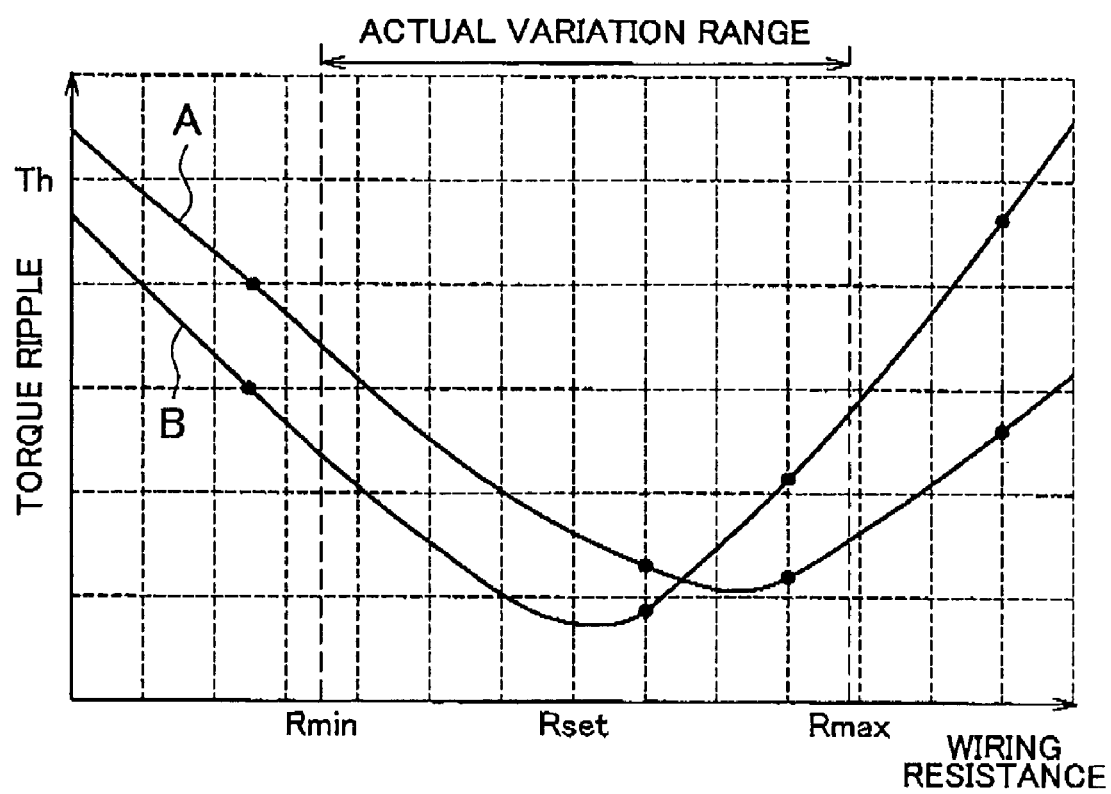
FIG. 16 is a diagram showing the relation between a wiring resistance and a torque ripple in a modified example of the embodiment.

The value of the wiring resistance R calculated in the above-described manner may be different from the actual value of the wiring resistance due to variation of each electric component caused by manufacturing. However, as shown in FIG. 16, it is possible to perform design so that the difference between the calculated value of the wiring resistance R and the actual value of the wiring resistance is sufficiently small as compared to the range in which a torque ripple is smaller than a torque ripple permissible value. Hereinafter, description will be made with reference to FIG. 16.

FIG. 16 is a diagram showing the relation between the wiring resistance and the torque ripple. The relation shown in FIG. 16 is obtained as a result of general simulation calculation. As shown in FIG. 16, the torque ripple of the motor tends to increase as the difference between the wiring resistance and a set value Rset increases. The set value Rset is set as the wiring resistance R at the time of design. This tendency does not change when a use condition is changed between a condition A and a condition B. Accordingly, if the actual value of the wiring resistance at the time of manufacturing is much larger or much smaller than the set value Rset that is the wiring resistance value set at the time of design, the torque ripple becomes larger than a torque ripple permissible value Th that is permitted in the design. As a result, the apparatus cannot be used. However, the actual range of variation of the wiring resistance R is a range from a wiring resistance Rmin that is the minimum possible wiring resistance at the time of manufacturing, to a wiring resistance Rmax that is the maximum possible wiring resistance at the time of manufacturing. Therefore, as shown in FIG. 16, if the wiring resistance R is any value in the range, the torque ripple is smaller than the torque ripple permissible value Th.

Thus, the value of the wiring resistance R stored in the configuration in the second and third embodiments and the modified examples thereof may be calculated in the manner described above. In this case, it is possible to omit the voltage sensor 16, and to reduce the torque triple to a value equal to or smaller than the permissible value.

In each of the first to third embodiments, the voltage needs to be detected using the voltage sensor 16 because the voltage applied to the motor may be different from the power supply voltage due to a voltage drop caused by the shunt resistance in the current sensor 14 and the wiring resistance, as described above. In addition, it is not possible to neglect a voltage drop due to the equivalent resistance of an electrolyte capacitor 34 shown in FIG. 17 that is connected in parallel to the both ends of the motor drive circuit 13, and a serial resistance of the equivalent resistance and a wiring resistance up to connection points.

Figure 17:
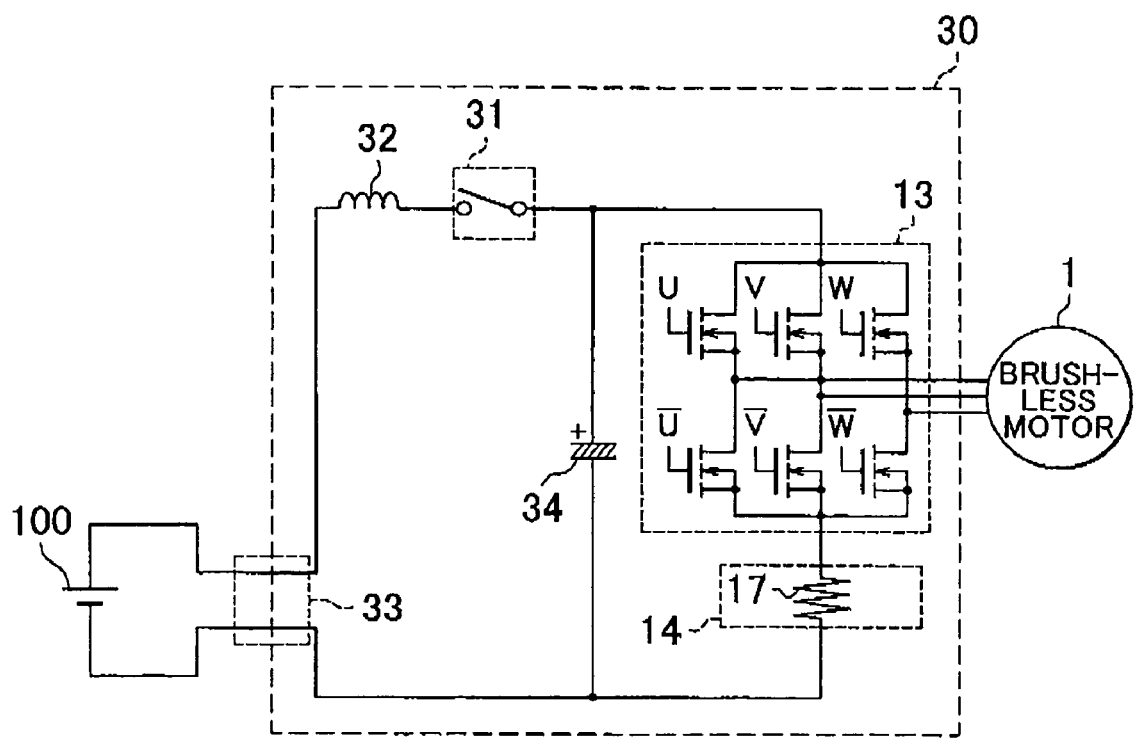
FIG. 17 is a circuit diagram showing a diagram including, for example, wires between a vehicle-mounted battery and the motor drive circuit in a modified example of the embodiment.

FIG. 17 is a circuit diagram showing a circuit including, for example, wires between the vehicle-mounted battery and the motor drive circuit in the modified example of the embodiment. As shown in FIG. 17, a current also flows to the electrolyte capacitor 34 connected in parallel to the both ends of the motor drive circuit 13. Therefore, the voltage at the both ends of the motor drive circuit 13 is detected using the voltage sensor 16 to prevent the influence of a voltage drop due to the wiring resistance and the like, that is, the voltage drop including a voltage drop due to the equivalent resistance of the electrolyte capacitor 34. Accordingly, although the three-phase voltage correction portion 39 in each of the second and third embodiments calculate the wiring resistance R that is the resistance of the wires and the like in the current path from the power supply to the both ends of the motor drive circuit 13, it is preferable that the calculated wiring resistance R should include the equivalent resistance of the electrolyte capacitor 34 and the wiring resistance up to the connection points. In the modified examples as well, it is preferable that the calculated wiring resistance R should include the equivalent resistance of the electrolyte capacitor 34 and the wiring resistance up to the connection points.

What is claimed is:

1. A motor control apparatus that drives a motor with n phases, wherein n is a natural number equal to or larger than 3, the motor control apparatus comprising:
   a controller that determines a level of a command voltage used to drive the motor;
   a motor drive signal generator that generates a pulse width modulation signal having a predetermined pulse width in each unit period, using a voltage whose level is equal to the level determined by the controller; and
   a motor drive circuit having
      a plurality of upper and lower switching elements that drive the motor based on the pulse width modulation signal from the motor drive signal generator, and
      a switching circuit that supplies a current to the motor when the pulse width modulation signal turns the plurality of switching elements on/off,
   wherein the controller corrects the level of the command voltage to compensate for a change in voltage applied to the motor drive circuit in accordance with on/off states of the switching element, wherein the voltage applied to the motor drive circuit changes based on a number of the upper switching elements that is turned on.

2. The motor control apparatus according to claim 1, further comprising
a voltage detector that detects the voltage applied to the motor drive circuit from a power supply via a predetermined wire,
wherein the controller corrects the level of the command voltage based on the voltage detected by the voltage detector.

3. The motor control apparatus according to claim 2, wherein
the controller comprises an open-loop controller that determines the level of the command voltage based on a command current value that indicates an amount of a current to be supplied to the motor, and an angular velocity of a rotor of the motor, using a circuit equation of the motor.

4. The motor control apparatus according to claim 2, wherein
the controller corrects the level of the command voltage so that an on-period of the pulse width modulation signal is increased or decreased, in accordance with a change in voltage applied to the motor drive circuit, by a predetermined correction period that is set so that a value obtained by multiplying an amount of the change in voltage applied to the motor drive circuit from a reference voltage value to a changed voltage value by a period during which the voltage remains at the changed voltage value is equal to a value obtained by multiplying the changed voltage value by the predetermined correction period, in each of the n phases during the unit period.

5. The motor control apparatus according to claim 2, wherein
the controller comprises a current value calculator that determines any one current value of a detected current value that indicates an amount of a detected current flowing into the motor, a command current value that indicates an amount of a current to be supplied to the motor, and an estimated current value that indicates an amount of a current that is estimated to flow into the motor; and
wherein
the motor control apparatus calculates a value of a resistance including a resistance of a predetermined wire from the power supply, based on the current value determined by the current value calculator, and the voltage detected by the voltage detector, and the motor control apparatus corrects the level of the command voltage based on the calculated value of the resistance.

6. The motor control apparatus according to claim 1, wherein
the controller comprises a current value calculator that determines any one current value of a detected current value that indicates an amount of a detected current flowing into the motor, a command current value that indicates an amount of a current to be supplied to the motor, and an estimated current value that indicates an amount of a current that is estimated to flow into the motor; and
the motor control apparatus calculates a limit value that limits the level of the command voltage based on the current value determined by the current value calculator, and a value of a resistance including a resistance of a predetermined wire from the power supply so that an on-period that is an on-period for the phase to which a highest voltage is applied among the n phases, and that is increased by the correction does not exceed a period equivalent to one period of the pulse width modulation signal, or an on-period that is an on-period for the phase to which a lowest voltage is applied among the n phases, and that is decreased by the correction is equal to or greater than zero, based on the calculated value of the resistance and the current value determined by the current value calculator, and the motor control apparatus limits the level of the command voltage to a value equal to or lower than the calculated limit value.

7. The motor control apparatus according to claim 6, wherein
the controller calculates a predetermined limit period so that a value obtained by multiplying a voltage value, which is obtained by multiplying the current value determined by the current value calculator by the value of the resistance, by a period set to be in a range in which the correction period is a minimum value and the period equivalent to the one period is a maximum value is equal to a value obtained by multiplying the voltage value changed by the resistance by the limitation period;
the controller calculates the limit value that limits the level of the command voltage so that a period obtained by adding a half of the limitation period to the on-period for the phase to which the highest voltage is applied among the n phases before the on-period is increased by the correction does not exceed the period equivalent to the one period, or a period obtained by subtracting a half of the limitation period from the on-period for the phase to which the lowest voltage is applied among the n phases before the on-period is decreased by the correction is equal to or greater than zero, and the controller limits the level of the command voltage to a value equal to or lower than the calculated limit value; and
the controller sets a new on-period to a period obtained by subtracting a half of a period set to be in a range in which the correction period is a minimum value and the limitation period is a maximum value, from an on-period for each of all the n phases when the on-period is to be increased by the correction, and the controller sets the new on-period to a period obtained by adding a half of the period set to be in the range in which the correction period is the minimum value and the limitation period is the maximum value, to the on-period for each of all the n phases when the on-period is to be decreased by the correction.

8. The motor control apparatus according to claim 6, wherein
the controller calculates a predetermined limitation period so that a value obtained by multiplying a voltage value, which is obtained by multiplying the current value determined by the current value calculator by the value of the resistance, by a difference between a maximum permissible value of the on-period and a minimum permissible value of the on-period is equal to a value obtained by multiplying a voltage value changed by the resistance by the limitation period, and the controller calculates the limit value based on the calculated limitation period.

9. The motor control apparatus according to claim 2, wherein
the voltage detector comprises:
a first detector that detects a voltage applied to a first end of the motor drive circuit, the first end being connected to a positive electrode side of the power supply;
a second detector that detects a voltage applied to a second end of the motor drive circuit, the second end being connected to a negative electrode side of the power supply; and a calculator that detects the voltage applied to the motor drive circuit by calculating a value of a difference between the voltage detected by the first detector and the voltage detected by the second detector.

10. The motor control apparatus according to claim 5, further comprising:
a storage device in which the value of the resistance is stored, wherein the controller calculates the value of the resistance at time intervals longer than time intervals at which the level of the command voltage is determined, the controller stores the calculated value of the resistance in the storage device, and the controller corrects the level of the command voltage based on the value of the resistance stored in the storage device and the current value when the value of the resistance is not calculated.

11. The motor control apparatus according to claim 2, wherein the voltage detector includes:
a first input terminal that is connected between the motor drive circuit and a positive electrode side of the power supply; and
a second input terminal that is connected between the motor drive circuit and a shunt resistance.

* * * * *